United States Patent [19]
Nakayama et al.

[11] Patent Number: 5,970,260
[45] Date of Patent: Oct. 19, 1999

[54] CAMERA EQUIPPED WITH ZOOM LENS

[75] Inventors: Haruki Nakayama; Taku Wagatsuma; Tohru Tominami; Yoshito Katagiri, all of Hachioji; Yuichi Atarashi, Hino, all of Japan

[73] Assignee: Konica Corporation, Japan

[21] Appl. No.: 09/145,080

[22] Filed: Sep. 1, 1998

[30] Foreign Application Priority Data

Sep. 10, 1997 [JP] Japan ..................... 9-245191
Nov. 11, 1997 [JP] Japan ..................... 9-308671

[51] Int. Cl.⁶ .......................... G03B 17/00; G03B 15/03; G03B 13/10
[52] U.S. Cl. ............................ 396/80; 396/83; 396/84; 396/85; 396/176; 396/180; 396/349; 396/106; 396/319; 396/436; 396/379; 396/386; 396/538
[58] Field of Search ................... 396/79, 80, 84, 396/85, 88, 72, 349, 379, 384, 385, 386, 176, 378, 380, 448, 82, 83, 86, 87, 106, 81, 180, 539, 535, 435, 436, 319

[56] References Cited

U.S. PATENT DOCUMENTS 5,778,262  7/1998  Kobayashi et al. ............... 396/84
5,790,901  8/1998  Nakayama et al. .............. 396/82
5,887,201  3/1999  Maeno ............................ 396/86

FOREIGN PATENT DOCUMENTS 2201304  8/1990  Japan.

Primary Examiner—W. B. Perkey
Attorney, Agent, or Firm—Jordan B. Bierman; Bierman, Muserlian and Lucas

[57] ABSTRACT

In a camera equipped with a zoom lens for forming an image of an object onto a film surface, the camera is equipped with a front lens group composed of a first lens group, adjustable aperture blades, a second lens group, and a second lens group-holding member; a back lens group provided; and an actuator to drive the adjustable aperture blade. The actuator is provided on the object-side from a space between the second lens group and the back lens group.

26 Claims, 16 Drawing Sheets

CAMERA EQUIPPED WITH ZOOM LENS

BACKGROUND OF THE INVENTION

The present invention relates to a camera equipped with a zoom lens, and specifically to a camera equipped with a zoom lens of 2 lens group composition. In this connection, 2 lens group composition herein means that a zoom lens is composed of 2 lens groups which are differently moved each other in an optical axis direction. For example, in the present invention, the front lens group has a first lens group and a second lens group, and movement of these 2 lens groups is the same in the optical axis direction, and movement of the front lens group is different from that of the back lens group, therefore, the zoom lens of the present invention is a zoom lens of 2 lens group composition.

Conventionally, there are many cameras which come into the market, each of which is equipped with a 2-group composition zoom lens. As the zoom lens, so-called telephoto type zoom lens which is composed of a front lens group having positive refracting power and a back lens group having negative refracting power, is commonly used, and it has the structure in which zooming is conducted by changing a distance between the front lens group and the back lens group.

In almost zoom lenses of cameras, an adjustable aperture blade is located between the front lens group and the back lens group. By using such the telephoto type zoom lens, the overall length of lens is reduced as compared to its focal length, which results in contribution to size reduction of cameras.

Further, a camera equipped with a zoom lens having a structure in which a distance between the front lens group and the back lens group is reduced, and the front lens group is separated into a first lens group and a second lens group, and an adjustable aperture blade is located between them, also comes into the market. In this case also, a distance between the first lens group and the second lens group is constant, and a distance between the front lens group and the back lens group is changed at zooming as described above. This zoom lens has an advantage in which a distance between a position of the adjustable aperture blade and a front lens which is closest to an object side, is reduced, thereby, the front lens diameter is also reduced, and a short and slender lens barrel can be realized. In this connection, because a distance between the front lens group and the back lens group is reduced, the error sensitivity of the lens is increased, therefore it is unsuitable for a long-focus lens, but suitable for a short-focus lens, and specifically, very suitable for a camera using APS film whose picture size is so small that the focal length of the lens may be small.

Further, conventionally, there also be many cameras in each of which a lens cover is provided at the front end of a picture taking lens, and other than the lens cover, a lens cover base to support the rotating lens cover, a lens cover ring to open/close the lens cover by rotation, and the like, are arranged at least. These members are located in the order of the lens cover ring, lens cover, and lens cover base from the picture taking lens side.

Further, a camera equipped with a zoom lens is widely known, in which a lens barrel holding a zoom lens is extended by electromotion from a collapsible lens position at which the lens retreats most to a film side, to a photographing area in which photographing is carried out, through a non-photographing area in which photographing is not carried out; a focal length in the photographing area is previously divided into a plurality of small areas; and the lens barrel stops at an initial position of the predetermined small area by a zooming operation.

In these conventional cameras, a zoom position switch to output a signal for determining an initial position of the small area at a predetermined interval in the photographing area, and to output the same signal in also the non-photographing area; a collapsible lens switch to be switched on or off at a predetermined position in the non-photographing area; and a power switch to start the position control of the lens barrel, are provided. When the power switch is turned on when the lens barrel exists at a collapsible lens position, the lens barrel is extended, and after the collapsible lens switch is tuned on in the non-photographing area, the number of pulse signals generated by the zoom position switch is counted, and the lens barrel stops at its initial position at a focal length of the most wide angle. On the other hand, when the power switch is turned off when the lens barrel exists in the photographing area, after the pulse signal generated by the zoom position switch is detected, it is detected that the collapsible lens switch is switched off, and the lens barrel is operated so as to retreat to its collapsible lens position.

Further, in Japanese Patent Publication Open to Public Inspection No. 201304/1990, a cubic cum to move a moving lens in an objective lens in a zoom finder in the optical axis direction, and a gear train to rotate the cubic cum, are described.

However, in a camera equipped with the latter zoom lens of the conventional technology, although there are advantages as described above, there are many problems as follows.

Initially, actuators to operate an adjustable aperture blade are located at the back of the second lens group holding member which holds the second lens group. Accordingly, when actuators are replaced for repair, replacement is very troublesome because it is necessary to remove both of the first lens group holding member and the second lens group holding member.

Further, in the conventional cameras, the second lens group holding member to hold the second lens group is held by the first lens group holding member to hold the first lens group with an adjustable aperture blade between them. Accordingly, it is more troublesome to replace actuators for repair.

Further, normally, a front lens group holding member to hold the front lens group is moved straight in the optical axis direction by a helicoid or the like, and a back lens group holding member to hold the back lens group is moved straight in the optical axis direction by a cam groove. Then, zooming is conducted while a distance between them is changing. Accordingly, it is necessary that both of the front lens group holding member and the back lens group holding member are not rotated, but only moved straight, and that, in order to maintain a predetermined lens accuracy, the front lens group holding member is engaged with a straight movement guiding member to move straight the front lens group holding member, and the back lens group holding member is engaged with the front lens group holding member.

However, in the conventional cameras, because the actuator or the like, to operate the adjustable aperture blade, is located on the film surface side of the second lens group holding member, the actuator is a hindrance to have a sufficient engagement length in which the first lens group holding member which is one of the front lens group holding member is engaged with the back lend group holding member. As the result, an optical axis of the back lens group is easily inclined with respect to the optical axis of the front lens group, thereby, the lens performance is badly influenced. Further, in the optical system having a structure in which an adjustable aperture blade is placed between the front lens group, the eccentric sensitivity becomes high, and the optical axis of the back lens group is easily inclined with respect to that of the front lens group, as compared with the optical system of other structures, and this problem becomes conspicuous.

Further, in the conventional cameras, the second lens group holding member is held by the first lens group holding member, and the back lens group holding member is engaged with the first lens group holding member. Therefore, a distance between the back lens group holding member and the first lens group holding member is long, thereby, the sufficient engagement length can not be obtained. This is also one of several causes of easy inclination of the optical axis, and the lens performance is badly influenced. Further, because the back lens group holding member is engaged with the first lens group holding member, the second lens group which is not engaged with the back lens group holding member is easily shifted, as compared with the first lens group. In the optical system as in the present invention, there also be a problem that a shift of the second lens group with respect to the optical axis influences more greatly on the lens performance than the shift of the first lens group with respect to the optical axis.

Further, there is necessarily a slight gap between a cam groove and a cam pin in the back lens group holding member which is moved by the cam groove in the optical axis direction, and in order to absorb a lens position error generated by the gap, generally a tension spring or a compression spring is provided as a forcing member between the front lens group holding member and the back lens group holding member so that the cam pin is in contact with one side wall of the cam groove, however, in the above-described camera, the actuator, or the like, hinders to provide the spring, and therefore, there is no way except that the lens performance depends on only the parts accuracy of the cam groove and the cam pin. Further, in the optical system in which an adjustable aperture blade is provided in the front lens group, the variable magnification error sensitivity easily becomes high, therefore, it is necessary to more increase the positioning accuracy of the back lens group by the cam than that in the optical systems having other structures.

In view of the foregoing problems, the first object of the present invention is to solve the above problems and to provide a camera equipped with a zoom lens in which operations for assembly or repair are made easier, and further, the lens performance is sufficiently assured, in a camera equipped with a zoom lens which is composed of the front lens group and the back lens group in the order from the object side, and in which an adjustable aperture blade is located in the front lens group.

Further, the conventional lens cover unit is provided such that a lens cover ring and a lens cover are located in the order from the picture taking lens side. Accordingly, the lens cover is located far from the front lens of the picture taking lens by the thickness of the lens cover ring, and when rays of light incident aslant into the front lens are considered, it is necessary that the front lens diameter is increased, and as the result, the dimension of the lens cover itself is increased, thereby, the dimension of the lens barrel is also increased. Further, it is necessary that the lens cover unit has a certain amount of thickness because 3 members, that is, the lens cover ring, lens cover and lens cover base are superimposed on each other.

In view of such the problem, the second object of the present invention is to provide a camera equipped with a lens cover unit whose outer diameter is smaller, thereby, the lens barrel diameter can be reduced, and in which its thickness can be formed to be thinner.

As described above, conventionally, after the power switch is operated, the lens barrel is moved by detecting both of the collapsible lens switch and the zoom position switch, however, for designing reasons or dispersions during manufacturing, there is a case in which a switching position of the collapsible lens switch and the pulse signal generating position by the zoom position switch are overlapped with each other. For example, in the case where the camera is assembled such that an initial pulse signal by the zoom position switch is generated on the collapsible lens position side from the switching position of the collapsible lens switch, when the power switch is turned on at the collapsible lens position, the first signal by the zoom position switch is neglected, therefore, there is a problem in which the lens barrel stops at the second wide angle position although it is necessary that the lens barrel is stopped at an initial position on the wide angle end in the photographing area. When the power switch is turned off in the photographing area, the collapsible lens switch is not switched after the signal is generated by the zoom position switch, thereby, the operation of the lens barrel is different from the predetermined sequence, resulting in an operation error.

In view of such the problem, the third object of the present invention is to propose a camera equipped with a zoom lens in which no problem occurs in extension and retreat of the lens, even when the switching position of the collapsible lens switch is overlapped with the generating position of the pulse signal by the zooming position switch, by designing reasons or dispersions at manufacturing.

Further, as another problem, the following will be described. As described above, the cubic cum and the gear are described in Japanese Patent Publication o pen to Public Inspection No. 201304/1990, and in which the cubic cum and the gear are formed into separated parts. However, when the cubic cum and the gear are formed into separated parts, it is difficult that a position of the gear teeth and a cam position coincide with each other in the rotational direction, and specifically, in a subminiature camera such as an APS camera, it greatly influences on the viewfinder accuracy. In order to solve this problem, a camera in which the cubic cam and the gear are integrally molded, comes into the market.

For example, there is a shape of the cubic cam and gear as shown in FIG. 21. In FIG. 21, numeral 114 is a cubic cam and numeral 115 is a gear, and when the gear 115 is rotated, a cam pin, not shown in the drawing, moves forward or backward along cam surfaces 114a and 114b of the cam 114. When this member is molded, a parting surface of a fixed molding die and a movable molding die, that is, a parting line (P.L) has a position as shown in the drawing, and the parting line shown by a broken line crosses the cam surfaces 114a and 114b, however, burrs are easily generated on the parting line. Accordingly, when the cam pin comes into contact with burrs on the cam surfaces 114a and 114b, the accuracy of the viewfinder is badly affected, which is a problem.

Further, when the shape is as shown in FIG. 22, no burr is generated on the cam surfaces 124a and 124b, therefore, the above problem is dissolved. However, a molding die to mold the cubic cam 124 and a molding die to mold the gear 125 are separated from each other, therefore, the desirable accuracy hardly be obtained in a zoom finder of a subminiature camera such as an APS camera which requires high accuracy.

Accordingly, in the zoom finder or the like, the fourth object of the present invention is to provide a camera in which, at least, the cam surface to move a moving lens having high power and high sensitivity, is molded by the same molding die as the gear.

SUMMARY OF THE INVENTION

The first object described above can be attained by a camera equipped with a zoom lens, having: a front lens group comprising a first lens group, an adjustable aperture blade located on a film surface side from the first lens group, a second lens group located on the film surface side from the adjustable aperture blade, and a second lens group holding member for holding the second lens group; a back lens group located on the film surface side from the front lens group; and an actuator which is located on an object side separated from between the back lens group and the second lens group, and which drives the adjustable aperture blade.

Further, the above first object can be attained by a camera equipped with a zoom lens, composed of the front lens group and the back lens group in the order from the object side, in which the front lens group comprises the first lens group, the adjustable aperture blade, and the second lens group in the order from the object side, wherein a first lens group holding member for holding the first lens group is supported by a second lens group holding member for holding the second lens group, and wherein a helicoid for lens extension and retreat is provided on the second lens group holding member.

The above second object can be attained by a camera equipped with a zoom lens, in which a lens cover which is opened and closed by rotation, a lens cover base for supporting the lens cover by an axis, a lens cover ring for opening and closing the lens cover by rotation, and a decorative holding member for decorating the outside of the lens and holding the lens cover ring, are provided in front of the picture taking lens in the order from the picture taking lens side.

The above third object is attained by a camera equipped with a zoom lens in which a lens barrel holding the zoom lens is extended by electromotion from a collapsible lens position at which the lens barrel retreats most to a film side, to a photographing area in which photographing is conducted, through a non-photographing area in which photographing is not conducted; and a focal length in the photographing area is previously divided into a plurality of small areas, and the lens barrel is stopped at an initial position in the predetermined small area by a zooming operation, wherein the camera is provided with a control means, in which a zoom position switch for outputting a signal to determine the initial position in the small area at a predetermined interval in the photographing area, and for outputting the signal in also the non-photographing area; a collapsible lens switch to be switched on or off at a predetermine position in the non-photographing area; and a power switch for starting the position control of the lens barrel, are provided, and in which, when the power switch is turned on at the collapsible lens position, only the zoom position switch is detected and the lens barrel is advanced to the initial position in the first small area in the photographing area, and when the power switch is turned off in the photographing area, only the collapsible lens switch is detected and the lens barrel is caused to retreat to the collapsible lens position.

The fourth object is attained by a camera which is provided with a gear rotated by a variable magnifying operation of a zoom lens, and a cubic cam for moving a variable magnifying lens of a zoom finder in the optical axis direction by a cam surface which is integrally molded with the gear and provided in the axial direction, the camera characterized in that the outer diameter of a shaft adjacent to the gear is the same as that of the gear teeth or larger than that; the outer diameter of the cubic cam adjacent to the shaft is formed to be larger than that of the shaft; the cam surface is formed on the gear side; and a parting line is provided on the outer peripheral surface of the cubic cam.

DETAILED DESCRIPTION OF THE PREFERRED EMBODIMENT

Figure 1:
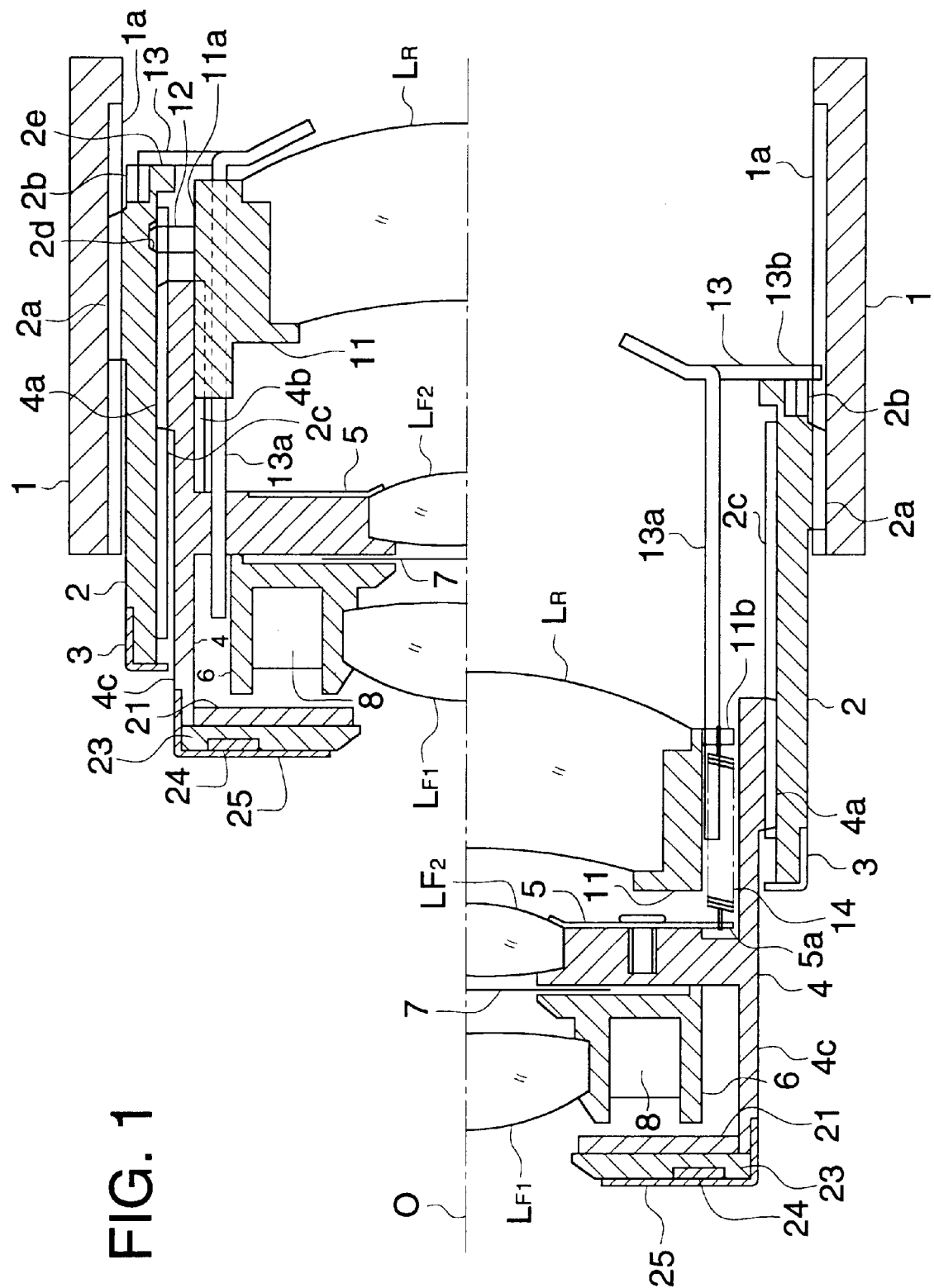
FIG. 1 is a longitudinal sectional view of a zoom lens barrel.
Figure 2:
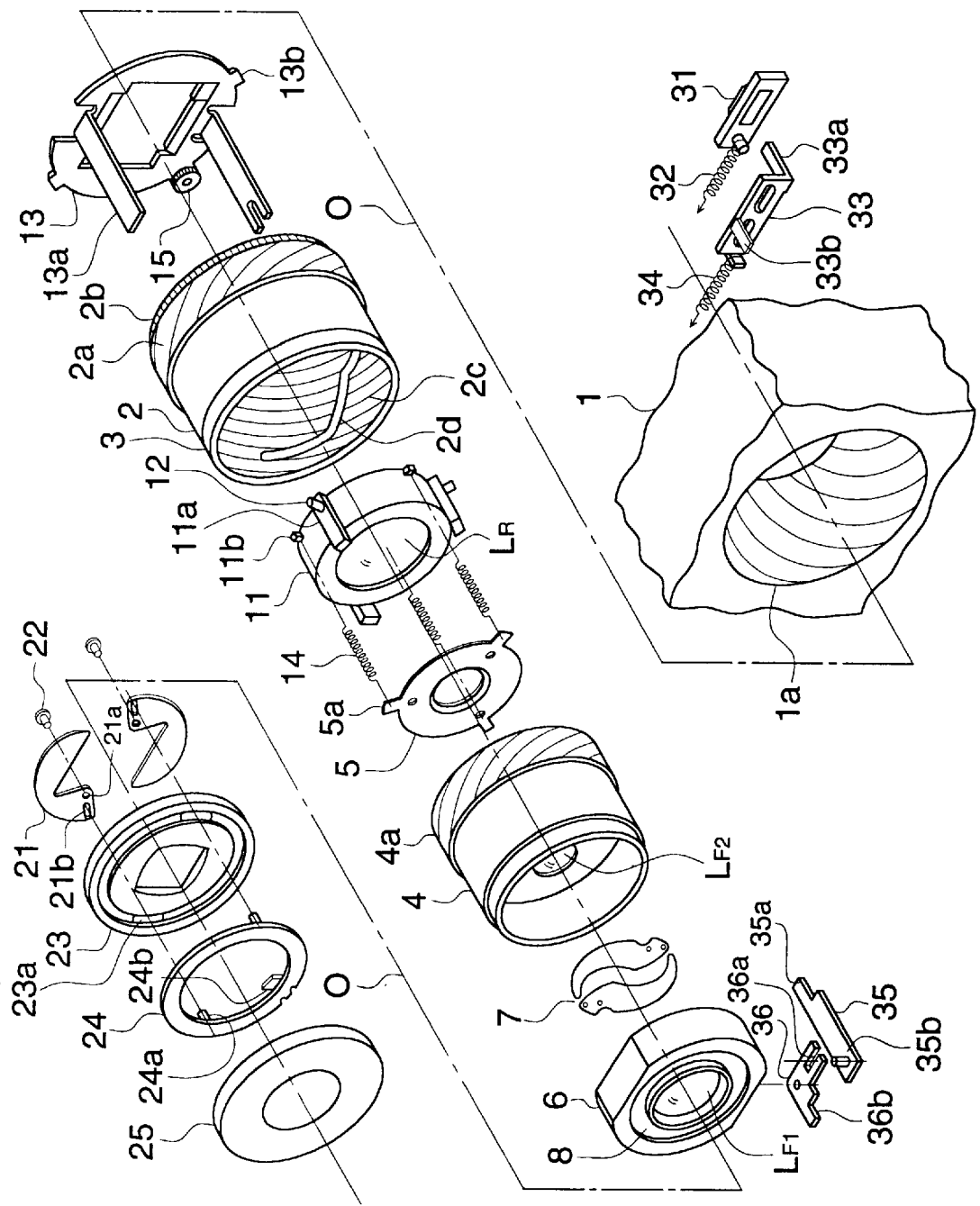
FIG. 2 is an exploded perspective view showing the zoom lens barrel.

Initially, a zoom lens barrel of the present invention will be described referring to FIGS. 1 and 2. FIG. 1 is a longitudinal sectional view of the zoom lens barrel, and in an upper half from the optical axis, a condition in which the zoom lens barrel is set to a wide angle end, is shown, and in a lower half from the optical axis, a condition in which the zoom lens barrel is set to a telephoto end, is shown. FIG. 2 is an exploded perspective view showing the zoom lens barrel.

In both views, numeral 1 is a fixed lens barrel, which has all of each member described below, and is fixed to a camera body, not shown in the drawings. A female helicoid 1a is provided in the inner periphery of the fixed lens barrel, and 2 guide grooves, not shown, for a straight advancing guide, which will be described later, are provided in parallel with the optical axis O at almost symmetrical positions with the optical axis O as the center. Numeral 2 is a cam barrel, on the outer periphery of which a male helicoid 2a which is engaged with the female helicoid 1a, and a large gear 2b are integrally formed, and on the inner periphery of which a female helicoid 2c and a cam groove 2d are formed. Further, because the diameter of an addendum circle of the large gear 2b is formed to be smaller than the root diameter of the male helicoid 2a, it is not in contact with a top of the female helicoid 1a of the fixed lens barrel 1. Numeral 3 is a decorative holding member to cover the female helicoid 2c, and the like, of the cam barrel 2. Incidentally, the cam barrel is not limited to that described in the present example, but any cylindrical member having a cam may be allowable.

Numeral 4 is a second lens group holding frame which is a kind of the second lens group holding member, and which also serves as a lens barrel for the second lens group. The second lens group holding member 4 holds the second lens group $L_{F2}$ in the front lens group of the zoom lens by its inner periphery, and further, the second lens group $L_{F2}$ is pressed by a holding plate 5 made of a thin plate, which is referred to as the second lens group holding member in the present example, from the back side. Further, the male helicoid 4a is provided on the outer periphery of the second lens group holding member 4, and the male helicoid 4a is engaged with the female helicoid 2c of the cam barrel 2. The second lens group holding member is not limited to a situation in the present example, but any member to fix and hold the second lens group may be allowable. A member such as a second lens group frame to fix and directly hold the second lens group may also be allowable, and a member to indirectly fix and hold the second lens group, for example, a lens barrel for the second lens group, or similar member, to fix and hold the second lens group frame, may also be allowed. In this connection, in the accuracy, a member to directly hold the second lens group is preferable. Further, the second lens group holding member has a cam groove, cam pin, and helicoid, and the second lens group holding member is preferably engaged with the cam barrel by the cam groove, cam pin, and helicoid. In this case, it is preferable that the helicoid is strong. Further, it is preferable that the front lens group holding member including the second lens group holding member is engaged with a straight advance guiding member, and that rotation of the front lens group holding member is prohibited by the straight advance guiding member.

Further, the front side outer periphery 4c of the second lens group holding member 4 is exposed outside and is one of external packing members.

In front of the second lens group holding member 4, the first lens group holding frame 6, which is a kind of the first lens group holding member to hold the first lens group $L_{F1}$ in the front lens group, is located, and the first lens group holding frame 6 is fixed to the second lens group holding frame 4 with the adjustable aperture blade 7 between them. Further, each of a circuit or actuator to drive the adjustable aperture blade 7 is located at each position in the front portion 8 of the first lens group holding frame 6.

The first lens group holding member is not limited to a situation as described in the present example, but any member to fix and hold the first lens group may be allowed. A member like the first lens group frame to fix and directly hold the first lens group may be allowed, and a member to indirectly fix and hold the first lens group, for example, a member like a lens barrel for the first lens group to fix and hold the first lens group, may be allowable. In this connection, a member like the first lens group frame to directly hold the first lens group is preferable. Further, it is preferable that the first lens group holding member is held by the second lens group holding member and fixed, and that the first lens group holding member is smaller than the second lens group holding member.

Further, the adjustable aperture blade in the present example, has a shutter function and also an aperture function, and actuator is a shutter driving member, however, as another situation, it may be allowed that only the aperture function is provided and the shutter is separately provided. In this case, the actuator moves the adjustable aperture blade only to adjust the aperture.

In the present invention, the actuator to dive the adjustable aperture blade, is located on the object side from between the back lens group and the second lens group. For example, it is located on the object side from between the first lens group and the second lens group, or from the first lens group. Specifically, as described in the present example, it is preferable that the actuator is provided in contact with the object side of the first lens group holding member.

Numeral 11 is a back lens group holding frame, which is a kind of a back lens group holding member to hold a back lens group $L_R$, and convex portions 11a which are provided at 3 portions on the outer periphery of the back lens group holding frame 11 and in parallel with the optical axis, are respectively engaged with concave portions 4b which are provided at 3 portions on the back side inner periphery of the second lens group holding frame 4 and in parallel with the optical axis. Accordingly, the back lens group holding frame 11 is held by the second lens group holding frame 4 while the same optical axis is maintained, and the back lens group holding frame 11 can slide in the optical axis with respect to the second lens group holding frame 4, however, it can not rotate around the optical axis. Further, 3 cam pins 12 are respectively studded on convex portions 11a of the back lens group holding frame 11, and are engaged with cam grooves 2d provided together with the female helicoid 2c on the inner periphery of the cam barrel 2.

The back lens group holding member is not limited to a situation described in the present example, but any member to fix and hold the back lens group may be allowed. A member like the back lens group frame to fix and directly hold the back lens group, or a member to indirectly fix and hold the back lens group, for example, a member like the back lens group frame holding member to fix and hold the back lens group frame, or like a lens barrel for the back lens group, may be allowable. In this connection, a member like the back lens group frame to directly hold the back lens group is preferable. Further, it is preferable that the back lens group holding member is engaged with the second lens group holding member and the movement in the optical axis direction is allowed, but the rotational movement is prohibited. Further, it is preferable that the back lens group holding member has a cam pin, cam groove and helicoid, and is engaged with the cam barrel and moved in the optical axis direction corresponding to rotation of the cam barrel. When it is cam-driven by the cam pin or cam groove, because the movement amount in the optical axis direction is non-linearly controlled more easily, it is preferable.

Further, a straight advance guiding plate 13 which is a straight advance guiding member formed of a metallic plate bent into L-shape, is provided at a back portion 2e of the cam barrel by a member, not shown in the drawing, so as to be rotatable around the optical axis. The straight advance guiding plate 13 has 2 straight advance guiding portions 13a parallel to the optical axis O, and the straight advance guiding portion 13a passes outside the outer periphery of the back lens group holding frame 11, and is engaged with a long groove and through hole provided on the inner periphery of the second lens group holding frame 4. On the other hand, the straight advance guiding plate 13 has 2 protruded portions 13b perpendicular to the optical axis O, and these portions 13b are engaged with guide grooves, which are 2 long grooves, not shown in the drawing, provided on the fixed lens barrel 1 and parallel to the optical axis O.

Accordingly, when the cam barrel 2 moves forward or backward being rotated, rotation of the straight advance guiding plate 13 is blocked by the protruded portion 13b and the straight advance guiding plate 13 only advances straight together with the cam barrel 2. Therefore, rotation of the second lens group holding frame 4 is blocked by the straight advance guiding portion 13a, and the second lens group holding frame 4 only advances straight. Further, the back lens group holding frame 11 is engaged with the second lens group holding frame 4 so that the back lens group holding frame 11 can slide only in the direction parallel to the optical axis, thereby, the back lens group holding frame 11 also only advances straight.

Incidentally, as described above, the shutter driving member is located in front of the second lens group holding frame 4, and sufficient space can be obtained in the back portion of the second lens group holding frame, therefore, a sufficient engagement length of the concave portion 4b of the second lens group holding frame 4 with the convex portion 11a of the back lens group holding frame 11 can be obtained, thereby, the optical axis of the first lens group $L_{F1}$, that is, the optical axes of the front lens group and the back lens group L securely coincide with each other.

Further, play is generated between the cam pin 12 studded on the back lens group holding frame 11 and the cam groove 2d of the cam barrel, in the direction parallel to the optical axis, in the processing accuracy. In order to absorb the play, protruded portions 5a are provided at 3 portions on the outer periphery of a lens holding plate 5 to hold the second lens group $L_{F2}$, and a tension spring 14 is stretched between the protruded portion 5a and a protruded portion 11b provided on the back lens group holding frame 11 in the same manner as in the former. As the result, the cam pin 13 is always pushed forward in the cam groove 2d, and comes into contact with only the front side surface of the cam groove 2d, thereby, the play in the cam groove 2d has no relation to others.

In this connection, the lens group holding plate can be considered as a portion of the second lens group holding member. Further, if a member has the structure in which one end of a forcing member is provided on the front lens group holding member, the other end of the forcing member is provided on the back lens group holding member, the back lens group holding member is forced in the optical axis direction by the forcing member, and thereby, the play of the cam groove is absorbed, any situation may be allowed, and is not limited to the situation in the present example.

Incidentally, as described above, the shutter driving member is located in front of the second lens group holding frame 4, therefore, thus the tension spring 14 can be stretched.

Further, in contrast to this, it can also be structured that the cam groove is provided on the back lens group holding frame 11, and the cam pin is provided on the cam barrel 2.

Figure 3:
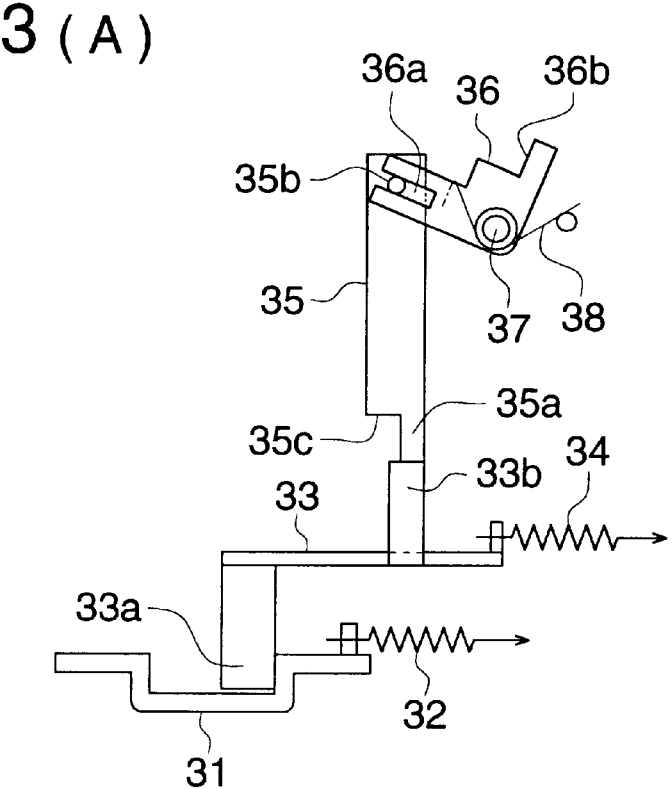
FIGS. 3(A) and 3(B) are plan views of a lens cover driving mechanism.
Figure 3:
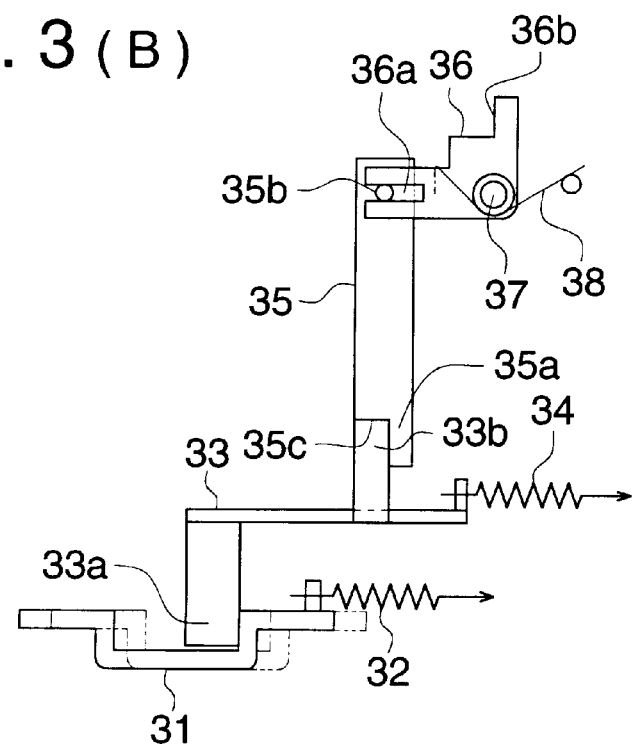

Next, referring to FIGS. 1, 2 and 3, a lens cover will be described.

In FIGS. 1 and 2, as lens cover component members, in front of the first lens group $L_{F1}$, in the order from the first lens group $L_{F1}$ side, the lens cover 21 composed of 2 members; the lens cover base 23 to hold a support shaft 22 which rotatably supports the lens cover 21 by a shaft hole 21a; the lens cover ring 24 which is rotated by a member, which will be described later, and which opens the closed lens cover 21; and a decoration frame 25 which is an external packing member to cover these members and into which a thin plate is contraction-processed, are located.

Further, when the lens cover ring 24 is inserted into a groove circularly provided on the lens cover base 23, positioning around the optical axis O is made, and in the direction of thickness of the lens cover ring 24, positioning is made by the bottom surface of the groove of the lens cover base 23 and the decoration frame 25.

In FIG. 2, operation pins 24a are provided at the back of the lens cover ring 24, and engaged with long holes 21b of the lens cover 21 through long holes 23a of the lens cover base 23. Further, a spring, not shown in the drawings, is provided on the lens cover ring 24, so that the lens cover ring 24 is forced clockwise. Accordingly, when the lens cover ring 24 is not driven by a member, which will be described later, the lens cover 21 is rotated around a shaft hole 21a clockwise and is closed.

Next, referring to FIGS. 2 and 3, an open/close mechanism of the lens cover will be described. FIG. 3 is a plan view of a lens cover driving mechanism, FIG. 3(A) is a view showing a condition that the lens cover is closed, and FIG. 3(B) is a view showing a condition that the lens cover is opened.

In both views, numeral 31 is a lens cover operation member, which is attached to a camera body, not shown in the drawings, or the fixed lens barrel 1, and can slide horizontally and is forced in one direction by a tension spring 32.

Numeral 33 is the third lens cover driving member, which is attached to the camera body or the fixed lens barrel 1 in the same manner, and can slide horizontally and is forced in one direction, and its first end portion 33a which is bent into L-shape, is engaged with the lens cover operation member 31. Numeral 35 is the second lens cover driving member, which is engaged with a long groove, which is provided on the inner periphery of the second lens group holding frame 4 and parallel to the optical axis, not shown in the drawing, and can slide in the optical axis direction, and when the lens cover is closed, its back end portion 35a is in contact with the second end portion 33b which is bent into L-shape, of the third lens cover driving member 33, as shown in FIG. 3(A). Numeral 36 is the first lens cover driving member, which is formed into crank-shape, and is forced counterclockwise by a torsion coil spring 38 around a support shaft 37 provided on the first lens group holding frame 6; a fork-like portion 36a provided on its one end is engaged with an engagement pin 35b studded on the second lens cover driving member 35; and a side surface of the other end portion 36b can engage with a side surface of the engagement portion 24b which is bent toward the back of the lens cover ring 24.

In this connection, only when the first lens group holding frame 6 is fixed to the second lens group holding frame 4, the fork-like portion 36a of the first lens cover driving member 36 is engaged with the engagement pin 35b of the second lens cover driving member 35.

In the above structure, when the zoom lens barrel is retracted, the situation is as shown in FIG. 3(A), and the side surface of the other end portion 36b of the first lens cover driving member 36 is separated from the side surface of the engagement portion 24b of the lens cover ring 24. Accordingly, as described above, the lens cover ring 24 is rotated clockwise and the lens cover 21 is closed.

When the lens cover operating member 31 is sliding-operated to the left against the tension spring 32 from this situation as shown in FIG. 3(B), the third lens cover driving member 33 also slides to the left by the first end portion 33a against the tension spring 34. Then, the second end portion 33b of the third lens cover driving member 33 is separated from the back end portion 35a of the second lens cover driving member 35. As the result, the second lens cover driving member 35 slides backward by the spring force of the torsion coil spring 38. Then, the second end portion 33b of the third lens cover driving member 33 comes into contact with a cutout portion 35c of the second lens cover driving member 35.

In this situation, the right side surface of the second end portion 33b of the third lens cover driving member 33 comes into contact with the left side surface of the back end portion 35a of the second lens cover driving member 35, therefore, the third lens cover driving member 33 can not return to the right by the spring force of the tension spring 34. However, only the lens cover operating member 31 can return independently to the initial position by the tension spring 32.

Further, in this situation, the first lens cover driving member 36 is rotated counterclockwise, and this is for the reason that the strength of the spring force of the torsion spring 38 is greater than that of the forcing member to rotate the lens cover ring 24 clockwise. As the result, the side surface of the other end portion 36b of the first lens cover driving member 36 pushes the side surface of the engagement portion 24b of the lens cover ring 24, and thereby, the lens cover ring 24 is rotated counterclockwise in FIG. 2. Accordingly, by the counterclockwise rotation of the operation pin 24a of the lens cover ring 24, the lens cover 21 is rotated counterclockwise around the shaft hole 21a, and the lens cover 21 is opened.

Incidentally, when the lens cover operating member 31 is operated as described above, a switch, not shown in the drawing, is turned on and the zoom lens barrel is extended to the wide angle position, and further, when a zoom switch, not shown in the drawing, is operated, it is further extended toward the telephoto end. At this time, the second lens cover driving member 35 is in a separated position from the third lens cover driving member 33, however, even when it is forced backward by the torsion spring 38, it does not retreat farther from a predetermined position by a stopper, not shown in the drawing, provided on the second lens group holding frame 4. The lens cover 21 is maintained to be opened. As the result, the right side surface of the second end portion 33b of the first lens cover driving member 33 is separated from the left side surface of the back end portion 35a of the second lens cover driving member 35, therefore, the third lens cover driving member 33 returns to the right by the spring force of the tension spring 34.

Operations of the zoom lens barrel in the above structure, will be described below.

Figure 4:
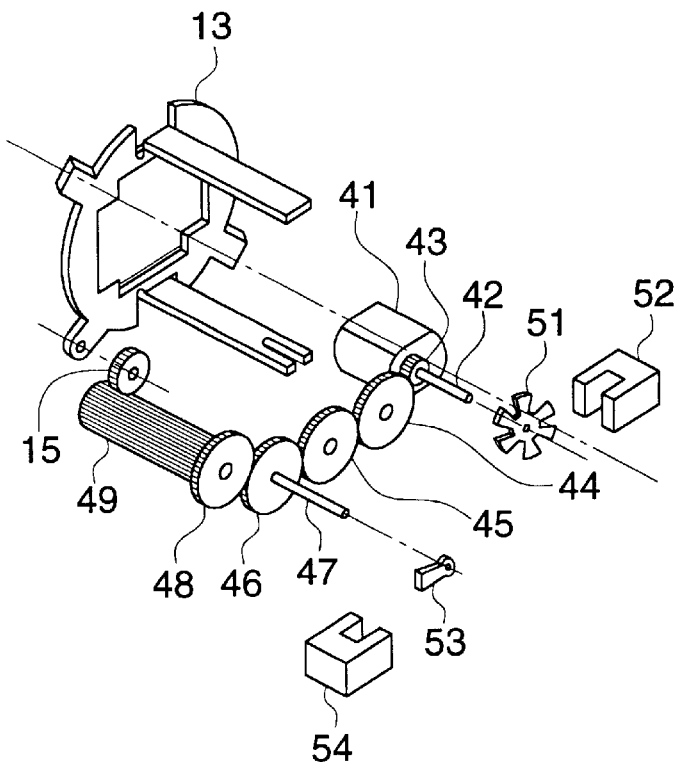
FIG. 4 is a perspective view of a lens barrel driving motor, and similar parts.

As describe above, when the lens cover operating member 31 is operated, the switch, not shown in the drawing, is turned on, and a lens barrel driving motor 141 shown in FIG. 4 is rotated. FIG. 4 is a perspective view in which the lens barrel driving motor to drive a small gear 15 shown in FIG. 2, reduction gears, etc., are viewed from the far side of FIG. 2. When the lens barrel driving motor 141 is rotated, the rotation of a pinion 143 provided on the motor shaft 142 is transmitted to a gear 149 which is long in the optical axis direction, through reduction gears 144, 145, 146 and 148, and the small gear 15 rotatably attached onto the straight advance guiding plate 13, is rotated.

Incidentally, a propeller 151 having a plurality of blades is attached onto a motor shaft 142, and pulse signals are outputted by a photo-interrupter 152. Further, a propeller 153 having one blade is attached onto a gear shaft 147 of the reduction gear 146, and a pulse signal is outputted by a photo-interrupter 154. Operations of these pulse signals will be described later.

The small gear 15 is engaged with the large gear 2b of the cam barrel 2, therefore, the cam barrel 2 is extruded from the fixed lens barrel 1 corresponding to a lead of the male helicoid 2a while being rotated. When the cam barrel 2 is rotated, the rotation is transmitted to the male helicoid 4a of the second lens group holding frame 4 by the female helicoid 2c, however, because the rotation of the second lens group holding frame 4 is blocked by the straight advance guiding plate 13, the cam barrel 2 is extruded straight corresponding to the lead of the male helicoid 4a.

The second lens group $L_{F2}$ is held by the second lens group holding frame 4, and the first lens group $L_{F1}$ is held by the first lens group holding frame 6. The first lens group holding frame 6 is fixed to the second lens group holding frame 4 with the adjustable aperture blades 7 between them, therefore, the first lens group $L_{F1}$ and the second lens group $L_{F2}$, which are front lens group, are extruded corresponding to each lead of 2 helicoids, while their lens interval is being maintained constant.

On the other hand, the cam pin 12 is moved in the optical axis direction by the rotation of the cam groove 2d of the cam barrel 2, and the rotation of the back lens group holding frame 11 is blocked by the second lens group holding frame 4, therefore, the back lens group holding frame 11 is extruded straight corresponding to the shape of the cam of the cam groove 2d. Accordingly, the back lens group $L_R$ is extruded straight corresponding to the lead and cam shape of the male helicoid 2a of the cam barrel 2.

Next, zooming and focusing in the present zoom lens barrel will be described. The zoom lens barrel is a so-called step-zoom type one in which a distance between the wide angle end and the telephoto end is divided into a predetermined number of stages, that is, steps, and zooming and focusing can be carried out by the same mechanism, thereby, a zoom lens barrel having a smaller and simple structure, can be realized.

A step-zoom diagram in FIG. 5 will be described below, in which the abscissa shows changes of a focal length, and a distance between the wide angle end and the telephoto end is divided into 6 steps. The ordinate shows amounts of movement in the optical axis direction of the front lens group and the back lens group of the zoom lens. As described above, because the front lens group is moved only by the helicoid, the movement is linear, however, because the back lens group is moved by a cam, an arbitrary movement diagram can be provided. For example, when focusing is conducted from a status ① which is an initial position at the wide angle end W and ∞, the lens is moved to a status ② at the closest distance N. The status ② corresponds to the closest distance N of an initial position at the focal length $M_1$ of the second wide angle, and when focusing is conducted at the focal length M1 of the second wide angle, the lens is moved from the status ② at the closest distance N to a status ③ at the infinity ∞. The status ③ of the infinity at the focal length M1 of the second wide angle, corresponds to the infinity ∞ of the initial position at a focal length $M_2$ of the third wide angle. As described above, in the step-zoom type, focusing is conducted while zooming is being conducted, that is, the focal distance is being changed, therefore, zooming and focusing can be conducted by the same mechanism.

Figure 6:
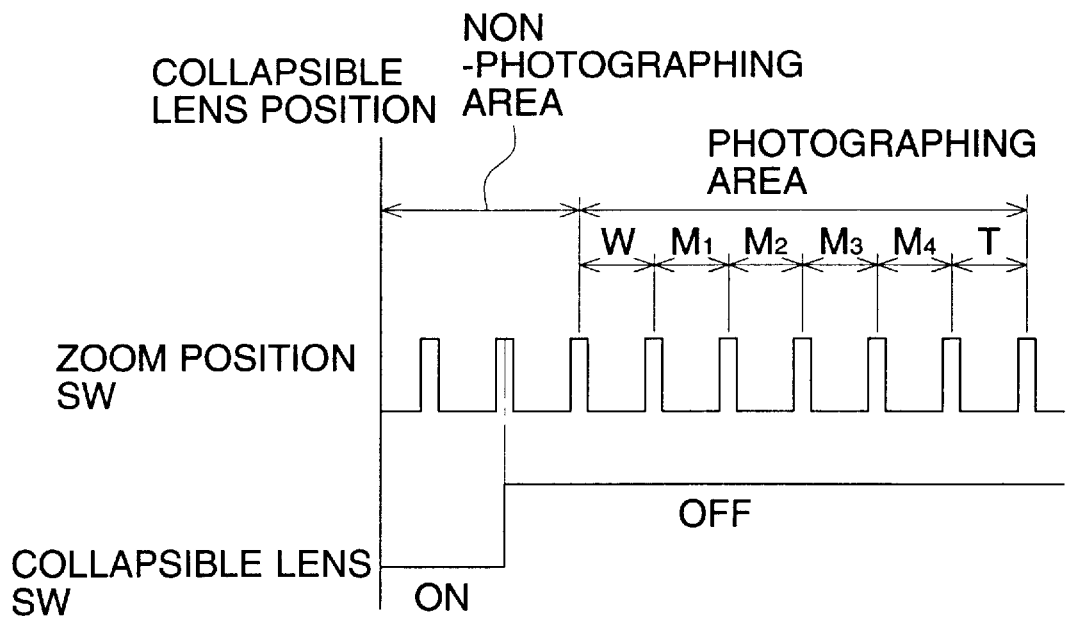
FIG. 6 is a timing chart for lens barrel movement.
Figure 7:
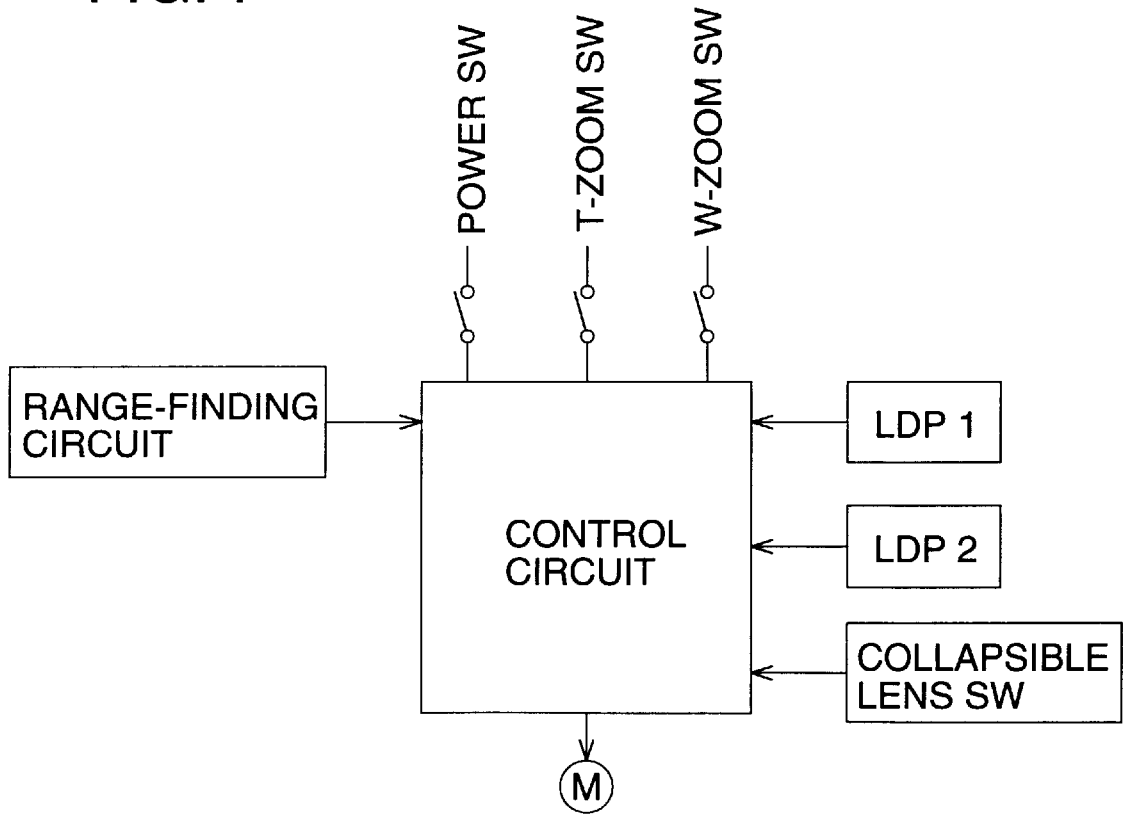
FIG. 7 is a block diagram of a control means for controlling forward or backward movement of the lens barrel.

Referring to FIGS. 4, 6 and 7, the structure of the step-zoom will be more detailed below. FIG. 6 is a timing chart of the lens barrel movement from the collapsible lens position to the photographing area, and FIG. 7 is a block diagram of a control means to control forward movement and backward movement of the lens barrel.

In FIG. 6, the collapsible lens position on the abscissa is a position at which the lens barrel retreats closest to the film side; a non-photographing area is an area in which the lens barrel is extruded from the collapsible lens position, but photographing can not be carried out; and a photographing area is an area in which the focal length is changed in 6 steps (small areas) between the wide angle end W (the widest angle position) and the telephoto end T (the most telephoto side) as described above, and photographing can be carried out. The zoom position switch on the ordinate corresponds to the propeller 153 and photo-interrupter 154 shown in FIG. 4, and outputs pulse signals (LDP2) to determine an initial position of each step at a predetermined interval in the photographing area, and when the reduction gear 146 is rotated as shown in FIG. 4, the zoom position switch generates pulse signals LDP2 in also the non-photographing area. The collapsible lens switch is not shown in the drawings, however, it is a switch to be turned from switch-on to switch-off in the non-photographing area with the movement of the lens barrel.

When the power switch to start the position control of the lens barrel is turned on when the lens barrel is located at the collapsible lens position, after the control circuit shown in FIG. 7 detects the status-on of the collapsible lens switch, the lens barrel driving motor 41 is rotated and the lens barrel is extruded. In this case, only the number of the pulse signals LDP2 of the zoom switch is counted independently of on/off of the collapsible lens switch, and in the case of FIG. 6, when the third pulse signal LDP2 is outputted, the lens barrel stops. This position is the initial position of the wide angle end W which is the first step in the photographing area. When the zoom switch is operated under the condition, the focal length is moved to M1~T, and an arbitrary focal length can be selected. Further, when focusing is conducted, distance information from a range-finding circuit and the number of continuous pulse signals (LDP1) which is outputted by the propeller 151 and photo-interrupter 152, shown in FIG. 4, and which has a small pitch, are compared with each other, and the lens barrel is stopped at a predetermined position.

Further, when the power switch is turned off when the lens barrel is located in the photographing area, after the control circuit detects the status-off of the collapsible lens switch independently of the pulse signal LDP2 of the zoom position switch, the lens barrel is moved backward. When a predetermined number of pulse signals LDP1 is counted after the collapsible lens switch is turned on, the control circuit judges that the lens barrel retreats to the collapsible lens position, and the lens barrel driving motor 41 is topped.

As described above, the control circuit, shown in FIG. 7, controls the lens barrel driving motor M by the power switch, zoom switch, distance information from the range-finding circuit, pulse signals LDP1, LDP2, and switching signal of the collapsible lens switch.

Figure 10:
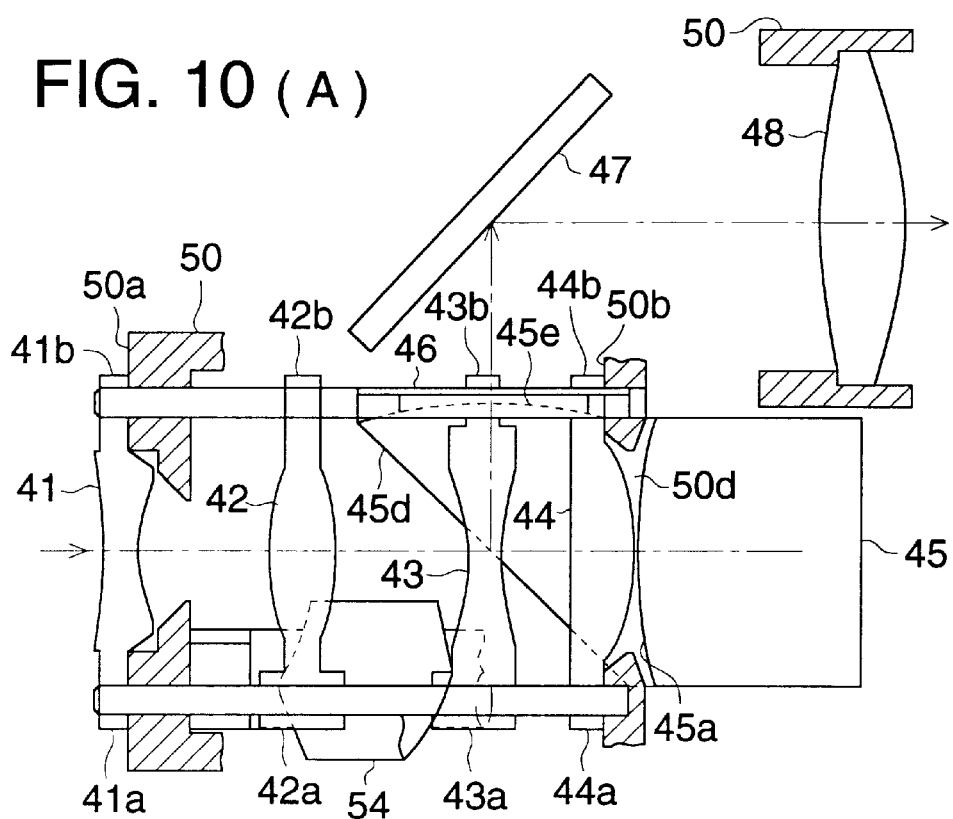
FIGS. 10(A) and 10(B) are sectional views of the real image type zoom finder.
Figure 10:
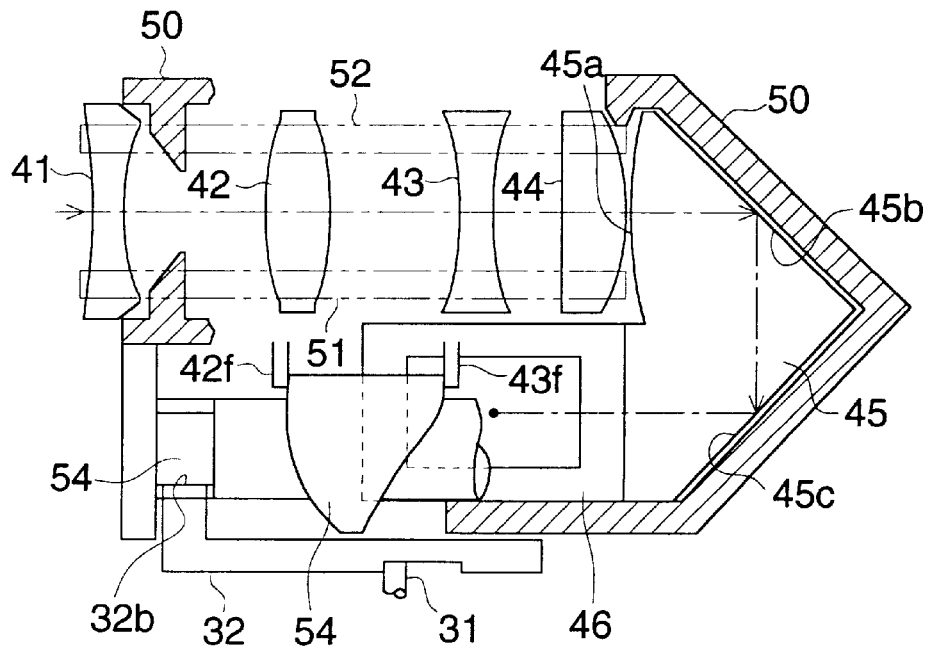

Next, referring to FIGS. 8 and 10, a zoom finder will be described.

Figure 8:
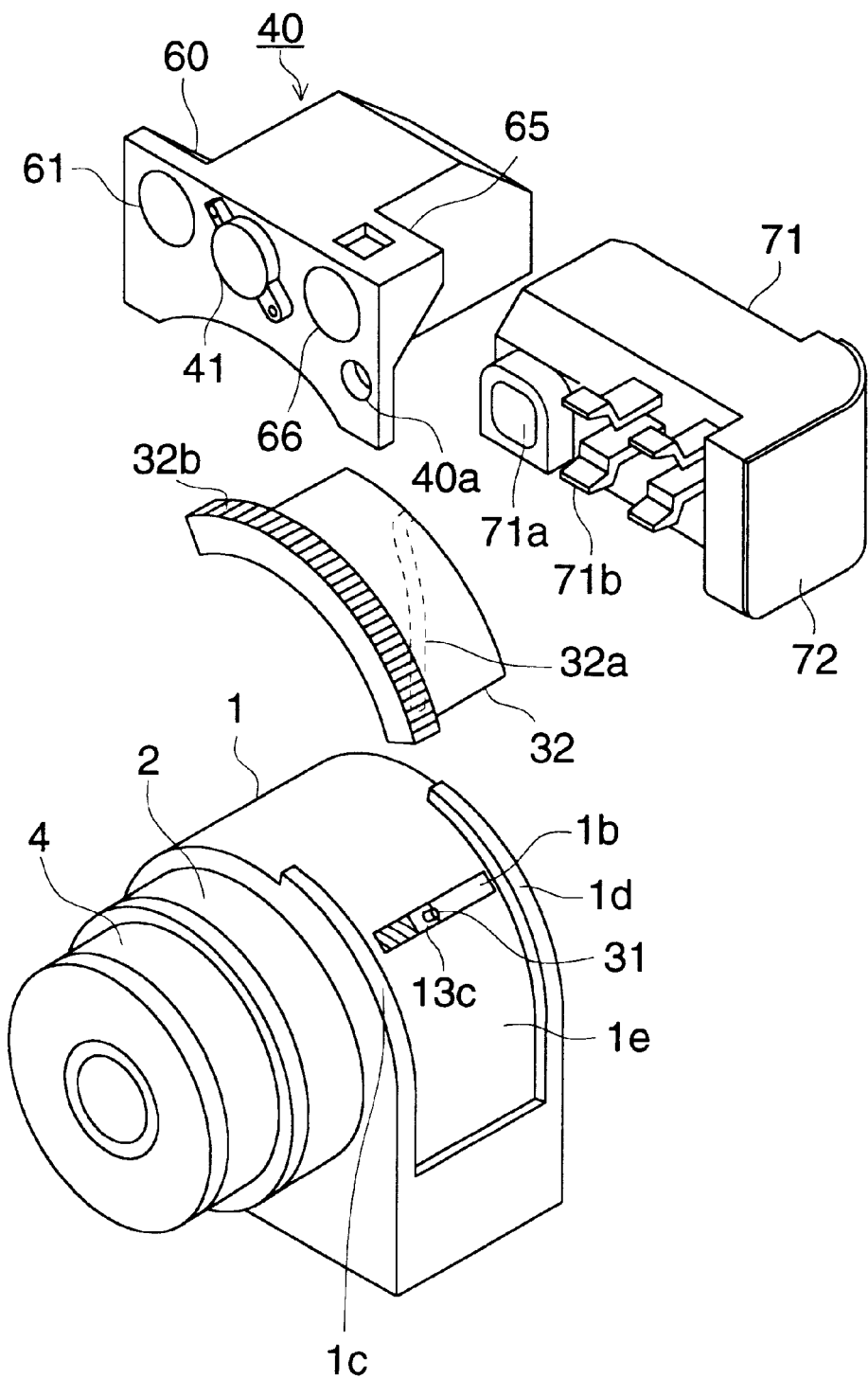
FIG. 8 is a perspective view of the zoom lens barrel and a zoom finder unit.

FIG. 8 is a perspective view of the zoom lens barrel, a zoom finder unit, and the like.

In FIG. 8, the fixed lens barrell, cam barrel 2, and the second lens group holding frame 4 are previously described in FIG. 1. The long hole 1b is provided on the side surface of the fixed lens barrell in the optical axis direction, and a second cam pin 31 is studded on the bent portion 13c in which a portion of the straight advance guiding plate 13 is bent forward, and is protruded from the long hole 1b. A cam member 32 and a finder unit 40 are located on the fixed lens barrel 1, and the second cam pin 31 is engaged with a second cam groove 32a provided on the back surface of the cam member 32. The second cam pin 31 is moved forward or backward in the optical axis direction, and the cam member 32 is not moved in the optical axis direction by regulating portions 1c and 1d protruded in the direction of circumference of the circle of the fixed lens barrel 1, and its position is regulated, therefore, the cam member 32 is rotated on the side surface portion 1e of the fixed lens barrel 1 only in the direction of circumference of the circle.

Further, a large gear 32b is provided on the outer periphery of the cam member 32, and is engaged with a small gear, which is provided in the finder unit 40, and which is not shown in the drawings and will be described later.

Figure 9:
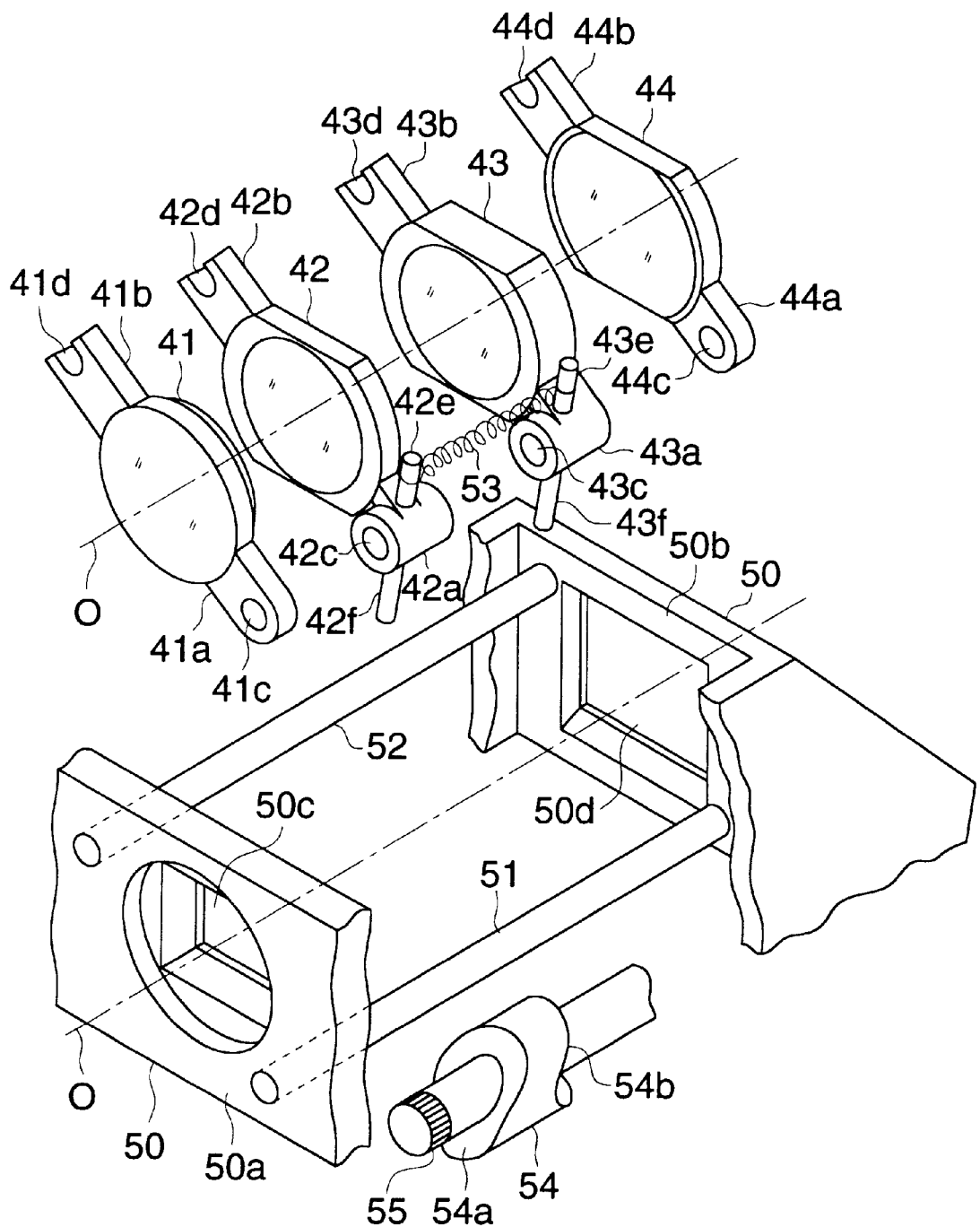
FIG. 9 is a perspective view of an objective lens of a real image type zoom finder.

Next, referring to FIGS. 9 and 10, a structure of a real image type zoom finder in the zoom finder unit 40 will be described. FIG. 9 is a perspective view of an objective lens, and the like, of the real image type zoom finder, FIG. 10 is a sectional view of the real image type zoom finder, FIG. 10(A) is its transverse sectional view, and FIG. 10(B) is its vertical sectional view.

In both drawings, an optical system of the real image type zoom finder will be described below. The objective lens is composed of the first lens 41 which is a concave lens, the second lens 42 which is a convex lens, the third lens 43 which is a concave lens, and the fourth lens 44 which is a convex lens. An object image transmitted backward through the objective lens, enters from the incident surface 45a which is formed of a gentle convex surface of a polo-prism 45, and is reflected forward on the second reflection surface 45c by 90°, further, reflected sideward on the third reflection surface 45d by 90°, and is projected from a projection surface 45e which is formed of a gentle convex surface. In this case, the object image is formed in the vicinity of the projection surface 45e by the objective lens, and therefore, a visual field frame 46 is located in the vicinity of the projection surface 45e. The object image projected from the projection surface 45e is reflected further backward on a reflection mirror 47, which is the fourth reflection surface, by 90°, and is formed at a position corresponding to the pupil of the photographer by an ocular eyepiece 48. Thus, the photographer can assuredly view the object image of the erect real image on each of the upper and lower sides and right and left sides.

In this connection, the first reflection surface 45b, the second reflection surface 45c and the third reflection surface 45d are structured by the polo-prism 45, however, each reflection surface may be structured by a reflection mirror.

Herein, the objective lens is structured by 4 lenses as described above, and the view finder in the present example is a zoom finder by which variable magnification is conducted, in which the first lens 41, the fourth lens 44 are fixed lenses, and the second lens 42 and the third lens 43 are moving lenses.

The first lens 41, the second lens 42, the third lens 43 and the fourth lens 44 have respectively the first arm portions 41a, 42a, 43a, 44a on their outer periphery in their normal line directions, and the second arm portions 41b, 42b, 43b, 44b in almost symmetrical positions about the optical axis O. Through holes 41c, 42c, 43c, 44c are respectively provided in the first arm portions 41a, 42a, 43a, 44a, and cutout portions 41d, 42d, 43d, 44d are respectively provided on the second arm portions 41b, 42b, 43b, 44b.

Incidentally, it is preferable that trough holes 41c, 42c, 43c, 44c and cutout portions 41d, 42d, 43d, 44d are almost symmetrical about the optical axis O. However, if all of 4 lenses are in the same position, even when each distance from the optical axis of trough holes 41c, 42c, 43c, 44c and cutout portions 41d, 42d, 43d, 44d is a little different from each other, there is no problem in the practical use. Further, even when each position on the circumference of the circle is not shifted from each other by 180° around the optical axis, when the position is on the approximately opposite side to the optical axis, there is no problem in the practical use.

Numeral 50 is a finder base, and is held by inserting the first guiding shaft 51 and the second guiding shaft 52 which are parallel to the optical axis. Accordingly, when each lens is assembled into the finder base 50, the second lens 42, the third lens 43, and the fourth lens 44 are located in the finder base 50, the first guiding shaft 51 and the second guiding shaft 52 are inserted from one end of the finder base 50, the first guiding shaft 51 is inserted into the through hole 42c of the second lens 42, the through hole 43c of the third lens 43, the through hole 44c of the fourth lens 44, and the second guiding shaft 52 is inserted into the cutout portion 42d of the second lens 42, the cutout portion 43d of the third lens 43, and the cutout portion 44d of the fourth lens 44. Further, the through hole 41c of the first lens 41 is set on the first guiding shaft 51, and the cutout portion 41d of the first lens 41 is set on the second guiding shaft 52, from the outer surface 50a side of the finder base 50.

Herein, the trough holes 41c, 42c, 43c, 44c are engaged with the first guiding shaft 51 with high accuracy, and also the cutout portions 41d, 42d, 43d, 44d, are engaged with the second guiding shaft 52 in the direction of width (the direction of circumference of the circle) with high accuracy. Further, in each lens, through hole 41c, 42c, 43c, 44c and cutout portions 41d, 42d, 43d, 44d are provided at the same positions around the optical axis. Accordingly, when the first guiding shaft 51 and the second guiding shaft 52 are inserted into each lens, and lenses are assembled into the finder base 50, the optical axis O of each lens coincides with each other with high accuracy.

As the fixed lens, after the first arm portion 41a and the second arm portion 41b of the first lens 41 are brought into contact with the outer surface 50a of the finder base 50 and positioned in the optical axis direction, these arm portions are fixed by adhesives, or the like, and after the first arm portion 44a and the second arm portion 44b of the fourth lens 44 are brought into contact with the inner surface 50b of the finder base 50 and positioned in the optical axis direction, these arm portions are fixed by adhesives, or the like.

On the other hand, the second lens 42 and third lens 43 as the moving lenses are held between the first lens 41 and the fourth lens 44 by the first guiding shaft 51 and the second guiding shaft 52 so that these lenses can slide. A pin 42e is studded on the upper portion of the first arm portion 42a of the second lens 42, a pin 43e is studded on the upper portion of the first arm portion 43a of the third lens 43, and a tension spring 43 is stretched between the pin 42e and the pin 43e, so that the second lens 42e and the third lens 43e are forced in the direction in which these lenses approach to each other. The third cam pin 42f is studded on the lower portion of the first arm portion 42a of the second lens 42, the fourth cam pin 43f is studded on the lower portion of the first arm portion 43a of the third lens 43, the third cam pin 42f is brought into contact with the first cam surface 54a of the cubic cum 54, located under the third cam pin 42f and the fourth cam pin 43f, and the fourth cam pin 43f is brought into contact with the second cam surface 54b.

A small gear 55 is integrally molded on the leading edge of the cubic cam 54, and engaged with the large gear 32b of the cam member 32 shown in FIG. 8. Accordingly, the large gear 32b is rotated with the variable magnification operation of the picture-taking lens, and the small gear 55 is rotated, therefore, the second lens 42 and the third lens 43 slide in the direction of optical axis O with the rotation of the cubic cam 54, and the variable magnification operation of the zoom finder is carried out.

As described above, in the objective lens in the present example, the fixed lens is held by 2 guiding shafts, and the moving lens is also directly held by 2 guiding shafts, not through the moving lens frame as in the past, therefore, the optical axis of each lens easily coincides with each other, and any shifting or tilting between lenses hardly occurs.

In this connection, because the first lens 41 and the second lens 44 are not moved, through holes 41c, 44c and cutout portions 41d, 44d may be tightly engaged with the fist guiding shaft 51 and the second guiding shaft 52, however, because the second lens 42 and the third lens 43 slide, it is preferable that through holes 42c, 43c and cutout portions 42d, 43d are a little loosely engaged with the first guiding shaft 51 and the second guiding shaft 52.

Figure 11:
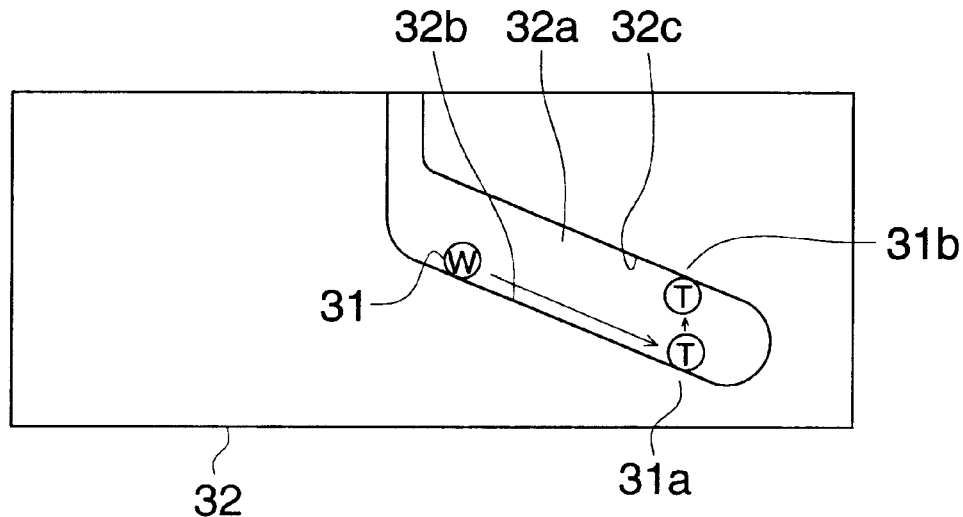
FIG. 11 is a development of a second cam groove of a cam member.

FIG. 11 is a development view of the second cam groove 32a of the cam member 32. The zoom lens barrel described in FIG. 1 conducts the following unique operation together with the second cam pin 31. That is, when the variable magnification operation is carried out from the wide angle end to the telephoto end, the second cam pin 31 slides along the front side surface 32b of the second cam groove 32, and when it is stopped at a predetermined focal length, the second cam pin 31 retreats by the width of the second cam groove 32a from the stopped position 31a, and stops at the position 31b at which the second cam pin 31 is brought into contact with the back side surface 32c of the second cam groove 32a. After that, when focusing operation is carried out, the second cam pin 31 moves forward within the range from the backward position 31b to the forward position 31a corresponding to a focusing distance.

Figure 5:
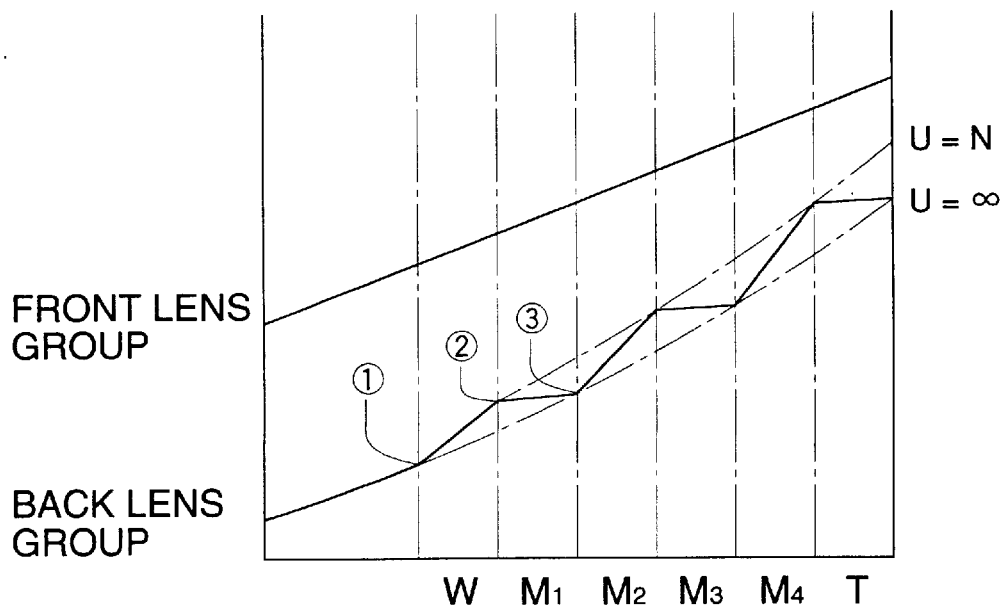
FIG. 5 is a step zoom diagram.

This zoom lens is thus structured to prevent the following: as described by the step zoom diagram in FIG. 5, the focal length of the zoom lens barrel of the present invention is changed also when the focusing operation is carried out, that is, because the zoom lens barrel is moved, when there is no play in the second cam groove 32a with respect to the second cam pin 31, the cam member 32 is rotated during the focusing operation; and as the result, the cubic cam 54 is rotated through the small gear 55, thereby, the zoom finder carries out the variable magnification operation. Because the photographer looks into the viewfinder during photographing, when the viewfinder carries out the variable magnification operation during focusing, it becomes very hard to look into the viewfinder, therefore, the above described structure is adopted in order to prevent that disadvantage.

Next, molding of the cubic cam 54 described in FIG. 9 will be described.

Figure 12:
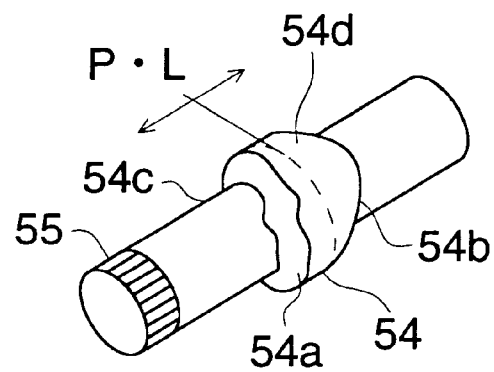
FIG. 12 is a view of a cubic cam integrated with a gear.
Figure 21:
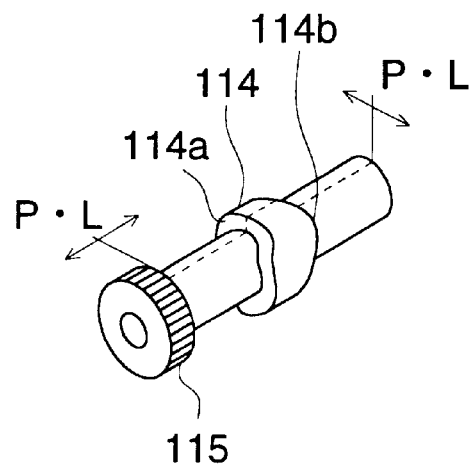
FIG. 21 is a view of a conventional cubic cam integrated with the gear.
Figure 22:
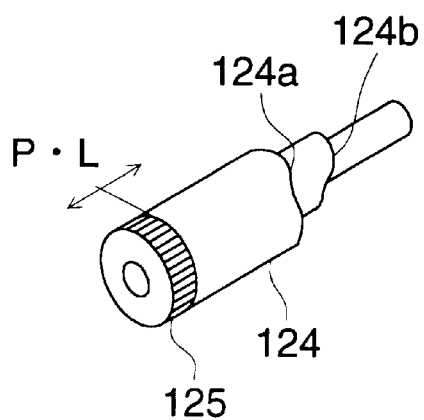
FIG. 22 is a view of a conventional cubic cam integrated with the gear.

The cubic cum shown in FIG. 12 is the same as the cubic cam 54 shown in FIG. 9, and the outer diameter of the shaft 54c is not smaller than the diameter of the top of the small gear 55, and further, the outer diameter of the cubic cam 54 is larger than that of the shaft 54c. Accordingly, in the outer peripheral surface 54d of the cubic cam 54, when the parting line P.L is set at a position between the first cam surface 54a and the second cam surface 54b, burrs are not so much generated on the cam surface as in the conventional technology as shown in FIG. 21. In this connection, in the small gear 55 and the second cam surface 54b, one is a fixed type and the other is a movable type, and their molding dies are different from each other. However, no problem occurs when the moving lens which has high sensitivity in the performance of the zoom finder and high power, is moved by the first cam surface 54a, and the movable lens which has low sensitivity and low power, is moved by the second cam surface 54b.

Figure 13:
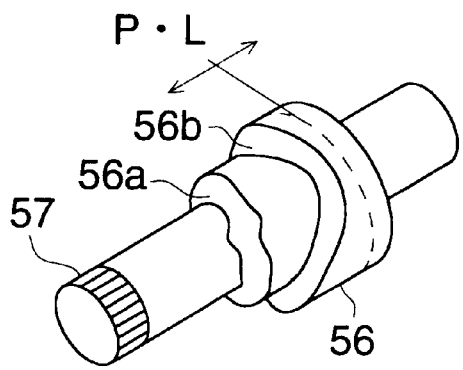
FIG. 13 is a view of a cubic cam integrated with a gear.

Further, in the cubic cam formed into 2 steps as shown in FIG. 13, when the parting line is set on the outer peripheral surface of the second step cubic cam 56 in the same manner as in FIG. 12, and the first cam surface 56a and the second cam surface 56b of the cubic cam 56 are positioned on the small gear 57 side, the same molding die can be used for all portions, and thereby, 2 moving lenses can be operated highly accurately.

Next, when returning to FIG. 8, the viewfinder unit 40 is provided with not only the above-described zoom finder, but also the range finding optical system. That is, the light projecting unit 60 to emit the infrared ray of light onto the object is located on the left side of the zoom finder, and the light projecting lens 61 to collect the light emitted from the light emitting element, is located on the left of the first lens 41. On the other hand, the light receiving unit 65 to receive the infrared ray of light reflected from the object, is located on the right side of the zoom finder, and the light receiving lens 66 to collect the light toward the light receiving element, is located on the right of the first lens 41.

Commonly, the light projection element is located at the back of the light projection lens, and the light receiving element is located at the back of the light receiving lens. However, in the present invention, reflection mirrors are respectively located at the back of a light projection lens 61 and the light receiving lens 66 at an inclination angle of about 45°, and thereby, the light from the light projection element is reflected to about 90°, and the received light is reflected to about 90° and introduced into the light receiving element.

Figure 14:
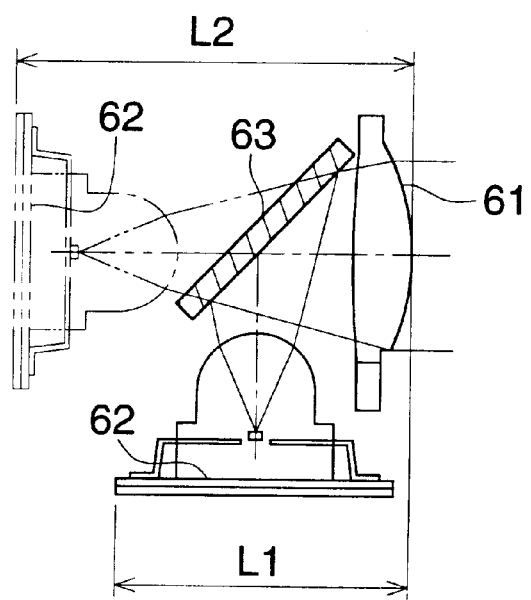
FIG. 14 is a longitudinal sectional view of an incident light unit.
Figure 15:
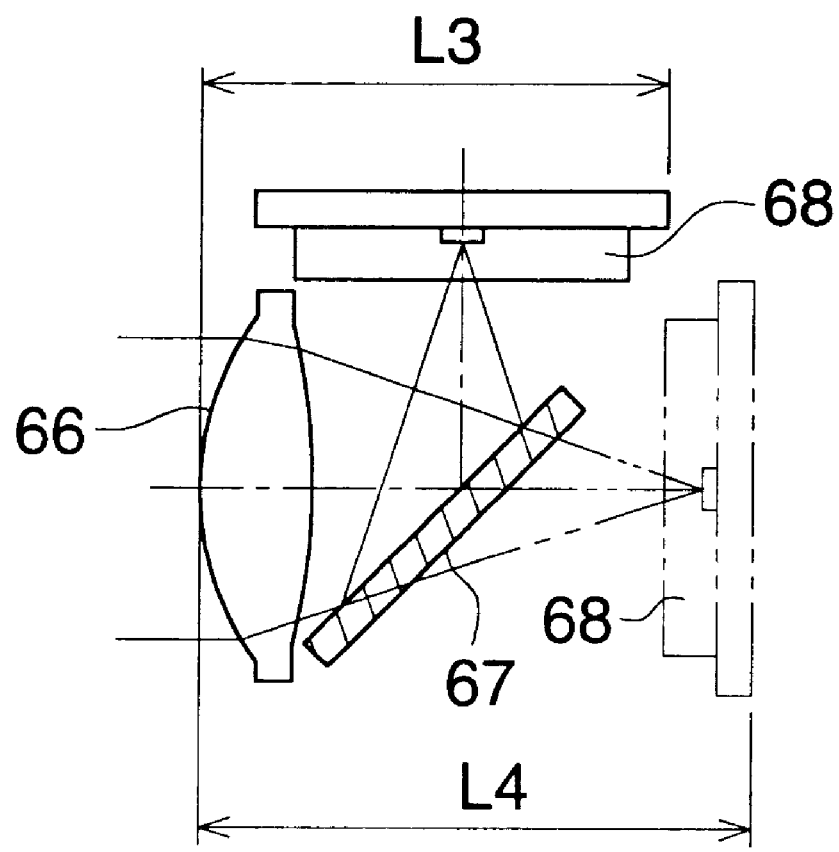
FIG. 15 is a longitudinal sectional view of a light receiving unit.

Referring to FIGS. 14 and 15, a reason for which the optical system is structured as described above, will be described below.

FIG. 14 is a vertical sectional view of the light projection unit, in which the light, projected from the light projection element 62 located at the lower portion, is reflected by the reflection mirror 63 at an approximately right angle, collected by the light projection lens 61, and emitted to the object. When the present invention structured as described above, is compared with the conventional technology in which the light projection element 62 shown by a two-dotted chain line is arranged at the back of the light projection lens 61, it can clearly be seen that, in the dimension in the horizontal direction, L1 in the present invention is smaller than L2 in the conventional technology. Accordingly, the present invention greatly contributes to the thickness reduction of the camera.

FIG. 15 is a vertical sectional view of the light receiving unit, in which the infrared ray of light reflected on the object is collected by the light receiving lens 66, reflected by the reflection mirror 67 at an approximately right angle, and enters into the light receiving element 68. When the present invention structured as described above, is compared with the conventional technology in which the light receiving element 68 shown by a two-dotted chain line is arranged at the back of the light receiving lens 66, it can clearly be seen that, in the dimension in the horizontal direction, L3 in the present invention is smaller than L4 in the conventional technology. Accordingly, in this case also, the present invention greatly contributes to the thickness reduction of the camera.

In this connection, in the present invention, the dimension in the vertical direction of both units is more increased than that in the conventional technology. However, in the zoom finder using the polo-prism as described above, the reflected light path is vertically provided in 2 steps, therefore, some amount of space is required in the vertical direction. The light projection unit and the light receiving unit adjoin the zoom finder, therefore, an increase in the direction of the height does not entirely influence on the dimension of the visual appearance.

As described above, when the reflection mirror is each provided in the light projection unit and the light emitting unit, the horizontal dimension of both units is decreased, and further, as clearly be seen in FIGS. 14 and 15, approximately triangle dead space is formed on the back surface of the reflection mirror. It is desirable that, in order to realize a subminiature camera, all space is effectively used and any dead space is not formed.

Accordingly, in the present example, as shown in FIG. 5, a battery chamber 71 to accommodate a cylindrical battery is provided in the vicinity of the back surface of the reflection mirror 67 in the light receiving unit 65. Because the cylindrical battery is arranged long sideways, the external shape of the battery chamber is approximately circular, and as shown in FIG. 16, the dead space on the back side surface of the reflection mirror can be effectively used.

Figure 16:
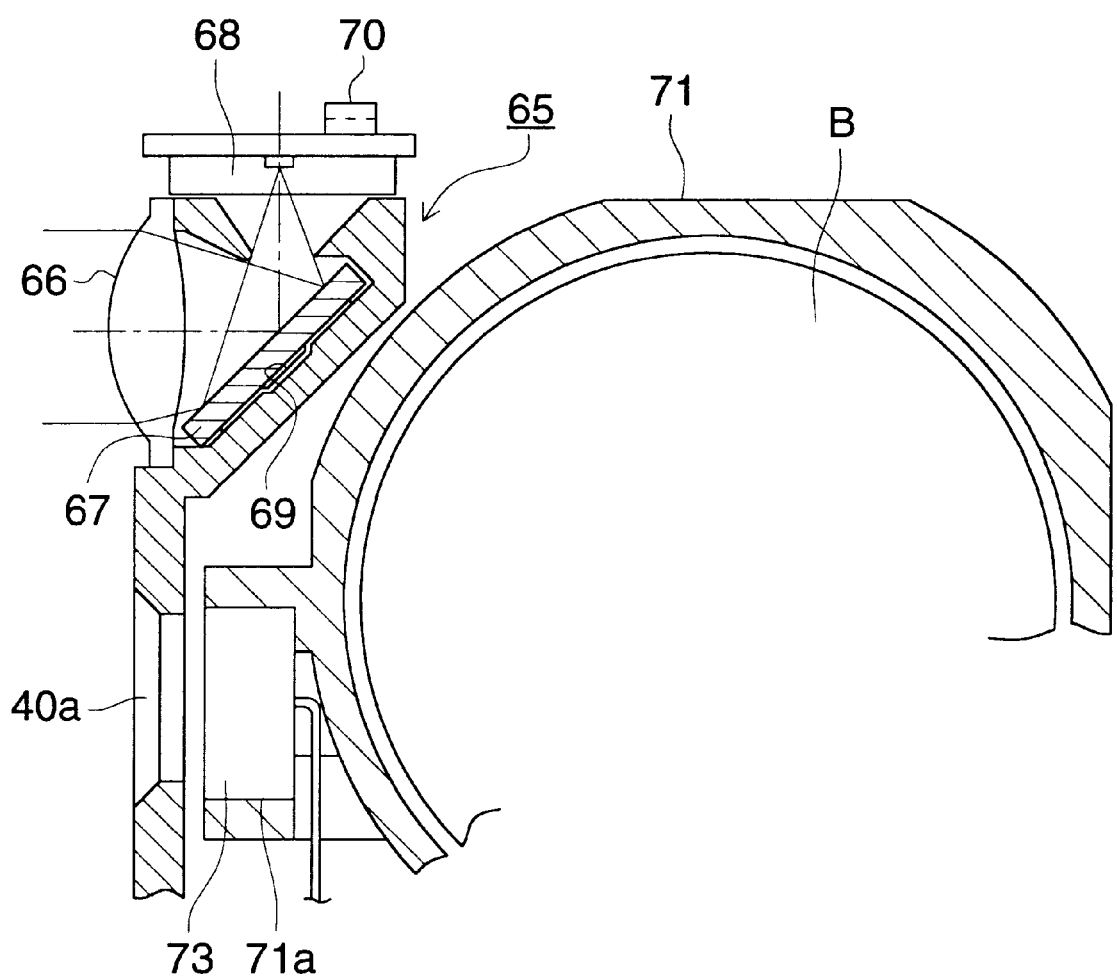
FIG. 16 is a longitudinal sectional view of a light receiving unit and a battery chamber.

FIG. 16 is a vertical sectional view of the light receiving unit 65 and the battery chamber 71. In the light receiving unit 65, the same members as in FIG. 15 are denoted by the same numbers. Incidentally, numeral 69 is a leaf spring to support the reflection mirror 67, and numeral 70 is an eccentric pin to adjust the position of the light receiving element 68.

Further, the cylindrical battery B is accommodated in the battery chamber 71, and a cylindrical lithium battery is preferable. The opening portion of the battery chamber 71 is covered by a battery cover 72 shown in FIG. 8. Incidentally, although not shown, a contact piece for the negative pole is provided in the depth of the battery chamber, and a contact piece for the positive pole is provided on the battery cover 72. Because the battery chamber 71 has no other opening portion, the accommodated cylindrical battery B is perfectly sealed. Accordingly, even if battery liquid of the cylindrical battery B leaks, it does not flow into the light receiving unit 65, or similar units, and when repairing is required, only battery chamber 71 may be replaced.

Incidentally, in the above-described light projection unit 60, the light projecting element 62 is located below the reflection mirror 63, however, it may be located above the reflection mirror 63, and in this case, the battery chamber 71 may be located in the vicinity of the back surface of the reflection mirror 63 in the light projection unit 60.

Further, from the viewpoint of the effective utilization of the dead space, a main capacitor for strobe light may be arranged long sideways instead of the battery chamber 71.

Further, a light receiving element made of CdS, or the like, which receives the light from the object and detects the brightness of the object so as to use it for the automatic exposure control, can be arranged on the front side wall of the battery chamber 71. That is, a accommodation portion 71*a* in which the light receiving element can be accommodated, is provided in the battery chamber 71 shown in FIG. 8, and a light receiving element 73 is arranged as shown in FIG. 16. In this connection, a light receiving window 40*a* which is penetrated for receiving the light, is provided in the viewfinder unit 40.

Further, as shown in FIG. 8, 2 pairs of holding portions 71*b* to hold a reflection umbrella of a strobe light emitting portion are provided vertically on the side surface of the battery chamber 71, and hold the back surface of the reflection umbrella, not shown in the drawings.

Further, a trigger transformer to apply high voltage on a trigger electrode of a discharging tube to emit strobe light, or similar parts, may be equipped on the side surface of the battery chamber 71.

Further, a red-eye effect reduction lamp may also be equipped.

As described above, the battery chamber 71 not only accommodates the cylindrical battery B, but also can be equipped with an arbitrary light emitting element or light receiving element on its side wall, and can position them.

Next, referring to FIGS. 17 to 20, in a camera into which APS film is loaded, an example in which a desired print size is arbitrarily selected from among a classic size, Hi-Vision size and panorama size by an external operation, and this information is magnetically recorded on the APS film, will be described.

Figure 17:
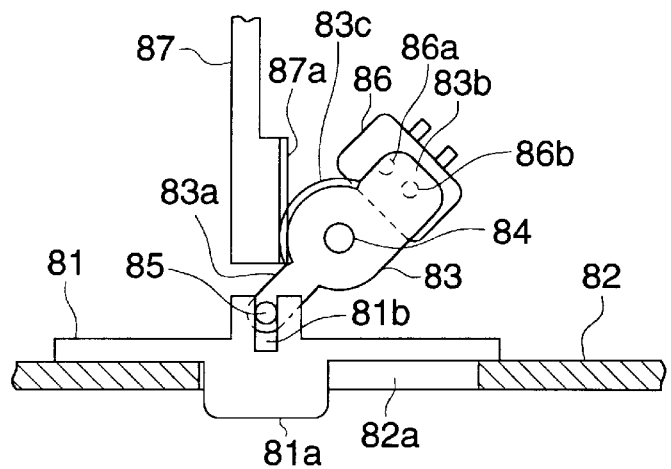
FIGS. 17(A) to 17(C) are plan views of a mechanism to select each print size.
Figure 17:
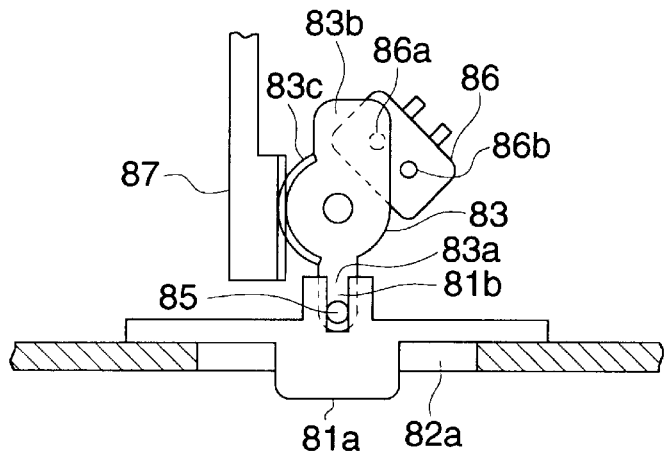
Figure 17:
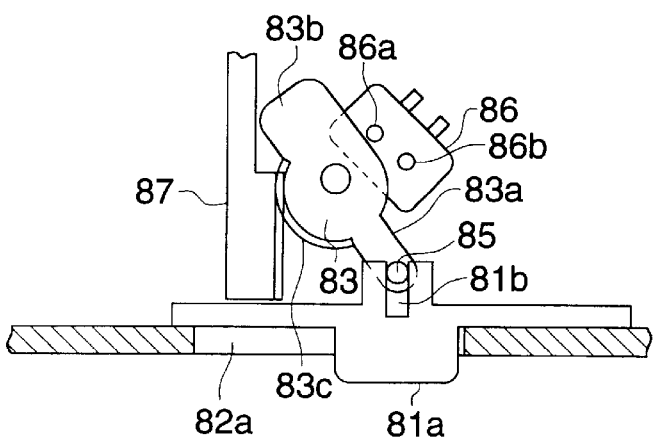
Figure 18:
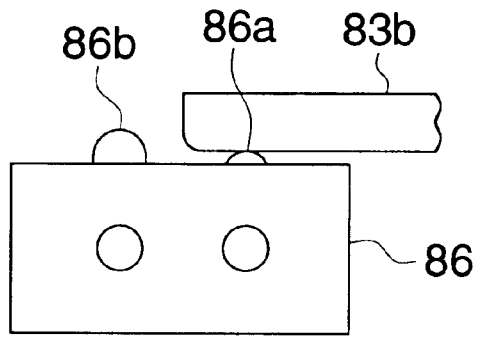
FIG. 18 is an enlarged side view of a second arm portion and an integral switch.

FIG. 17 is a plan view of a mechanism for selecting each print size, and FIG. 17(A) is a view for selecting the classic size, FIG. 17(B) is for the Hi-Vision size, and FIG. 17(C) is for the panorama size. In each view, numeral 81 is a print size switching member and an operating portion 81*a* is protruded outside from a long hole 82*a* of an outer packing member 82. Numeral 83 is a switch operating member and is rotated around a support shaft 84, and an operation pin 85 studded on the top of a first arm portion 83*a* is engaged with a fork-like portion 81*b* provided on the outer packing member 82. Numeral 86 is an integral unit switch, and when a switch operating member 83 is rotated and a second arm portion 83*b* presses movable portions 86*a*, 86*b* of the integral unit switch 86, an internal switch interlocked with the pressed movable portions is turned on or off, and a predetermined signal is outputted. An enlarged side view, in which the second arm portion 83*b* of the switch operating member 83 presses only the movable portion 86*a* of the integral unit switch 86, is shown in FIG. 18. Numeral 87 is a finder picture frame switching member, and a rack 87*a* is engaged with a partial gear 83*c* of the switch operating member 83, and by its movement position, the picture frame of the viewfinder is switched by using a well-known mechanism, not shown in the drawings.

In such the mechanism, when the operating portion 81*a* of the print size switching member 81 is moved to the left with respect to the long hole 82*a* of the outer packing member 82 as shown in FIG. 17(A), the fork-like portion 81*b* rotates the switch operating member 83 clockwise through the operation pin 85 and the first arm portion 83*a*. Then, the second arm portion 83*b* is rotated onto the integral unit switch 86, and presses both the movable portion 86*a* and the movable portion 8 1*b*, therefore, the integral unit switch 86 outputs a signal for the classic size. Further, the finder picture frame switching member 87 is moved upward in the drawing through the partial gear 83*c* and rack 87*a*.

Next, as shown in FIG. 17(B), when the operating portion 81*a* is slid to approximately the center with respect the long hole 82*a*, the fork-like portion 81*b* rotates the switch operating member 83 counterclockwise through the operation pin 85 and the first arm portion 83*a*. Then, the second arm portion 83*b* presses only the movable portion 86*a* of the integral unit switch 86, and releases the pressure of the movable portion 86*b*, therefore, the integral unit switch 86 outputs a signal for the Hi-Vision size. Then, further, the finder picture frame switching member 87 is moved slightly downward in the drawing by the partial gear 83*c*.

Further, as shown in FIG. 17(C), when the operating portion 81*a* is slid right with respect to the long hole 82*a*, the fork-like portion 81*b* rotates the operation pin 85 and the first arm portion 83*a* further counterclockwise. Then, the second arm portion 83*b* is not brought into the movable portion 86*a* and the movable portion 86*b* of the integral unit switch 86, therefore, the integral unit switch 86 outputs a signal for the panorama size. Further, the finder picture frame switching member 87 is moved downward in the drawing by the partial gear 83*c*.

In this connection, in a condition of FIG. 17(A), the second arm portion 83*b* may press only the movable portion 86*b*.

Figure 19:
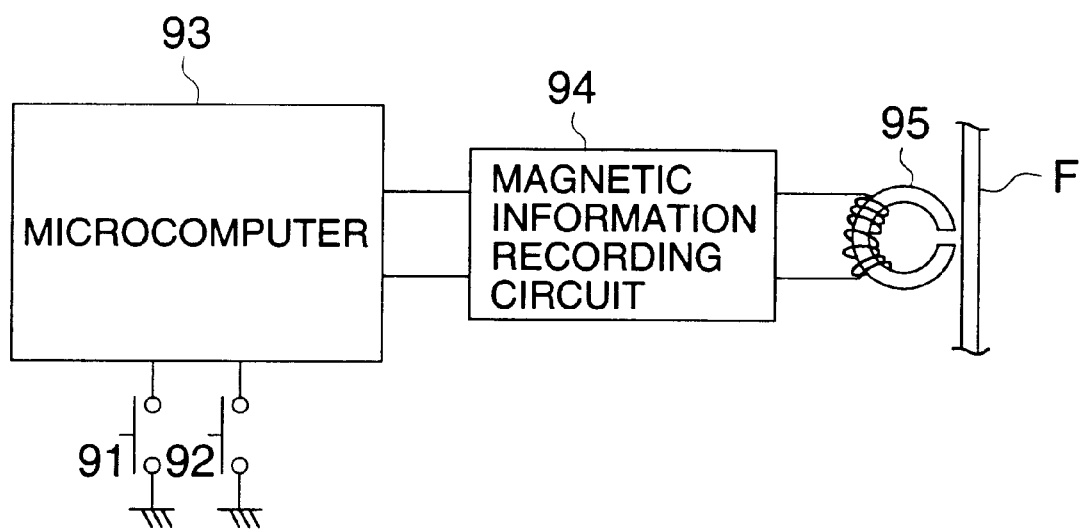
FIG. 19 is a circuit block diagram to magnetically record onto the APS film.

Next, a circuit block diagram in which magnetic recording is carried out on the APS film by a magnetic head according to a signal from the integral unit switch, will be shown in FIG. 19.

Internal switches 91 and 92 are operated by the movable portion 86*a* and the movable portion 86*b* of the integral unit switch 86, and the signal is outputted to a microcomputer 93.

In the microcomputer 93, any of signals of the classic size, Hi-Vision size and panorama size is outputted to a magnetic information recording circuit 94 according to the inputted signal, the magnetic information recording circuit 94 outputs a recording signal to a magnetic head 95, and the recording signal is magnetically recorded on a magnetic layer of the APS film F by the magnetic head 95.

Figure 20:
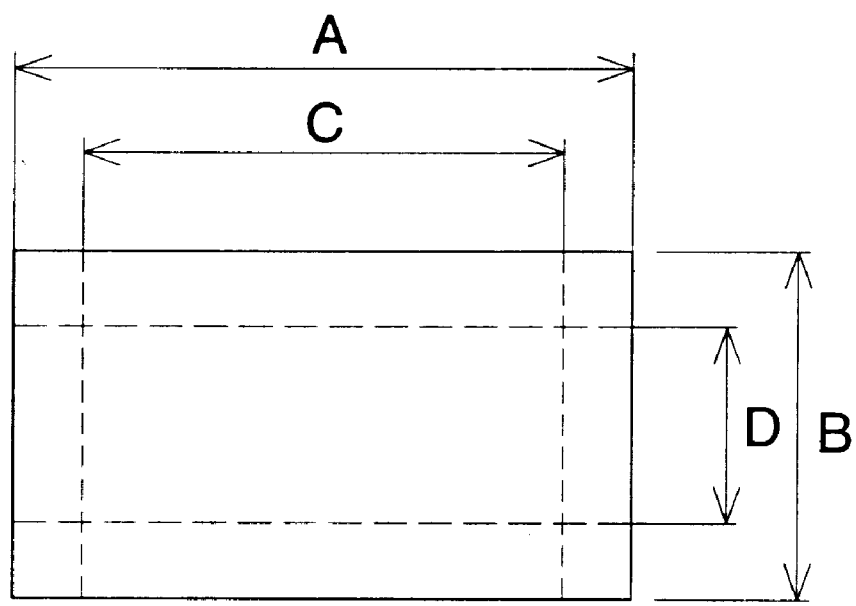
FIG. 20 is an illustration of each print size.

Herein, referring to FIG. 20, each print size will be described. A portion enclosed with 2 long sides A shown by a solid line and 2 short sides B represents the Hi-Vision size; a portion enclosed with 2 long sides C in which both ends of the long side A are light-shielded, and 2 short sides B shown by a short dashed line represents the classic size; and a portion enclosed with 2 long sides A and 2 short sides D, in which both ends of the short side B are light-shielded and which is shown by a long dashed line, represents the panorama size.

Accordingly, at least 2 light-tight plates are driven by the movement of the finder picture frame switching member 87, and a visual field frame under the condition that the light-tight plates are withdrawn, is made to be a Hi-Vision size visual field frame of A×B; when the Hi-Vision size visual field frame is light-shielded only from left and right sides by light-tight plates, a classic size visual field frame of C×B is formed; and when the Hi-Vision size visual field frame is light-shielded only from upper and lower sides by light-tight plates, a panorama size visual field frame of A×D is formed.

Incidentally, in a simple camera, it may be allowed that the finder picture frame switching member 87, light-tight plates, and their interlocking members are omitted, a common finder visual field frame is made to be A×B, and a short dashed line showing the classic size and a long dashed line showing the panorama size, etc., are displayed in the visual field frame.

Further, it may also be allowable that the light-tight plate to light-shield only in the vertical or horizontal direction, is provided, and other sizes are displayed by lines as describe above.

According to the present invention, when actuator or the like, is replaced at repair, it is not necessary to remove both of the first lens group holding member and the second lens group holding member, thereby, operations at repair become easier.

Further, the front lens group holding member can be tightly engaged with the back lens group holding member, thereby, it can be prevented that the front lens group and the back lens group are tilted with respect to the optical axis, and even in the optical system having the high eccentric sensitivity in which an adjustable aperture blade is located between the front lens group, the excellent lens performance can be obtained.

Further, a spring can be provided between the front lens group holding member and the back lens group holding member, thereby, the cam pin can be brought into contact with one side wall of the cam groove, an error of the lens position can be absorbed, and even in the optical system having the high variable magnification error sensitivity, the excellent lens performance can be obtained.

In this connection, when the second lens group holding member is engaged with the back lens group holding member, or the first lens group holding member is held by the second lens group holding member, the front lens group holding member can be more tightly engaged with the back lens group holding member, and a shift with respect to the optical axis of the second lens group whose influence on the lens performance is larger than that of the first lens group, can be prevented, thereby, the excellent lens performance can be obtained.

According to the camera equipped with a zoom lens of the present invention, a portion of the second lens group holding member is exposed on the external appearance, therefore, an outer packing part for exclusive use is not necessary, and size reduction of the lens barrel can also be realized.

According to the camera equipped with a zoom lens of the present invention, a shutter driving member is located in front of the second lens group holding member 4, and sufficient space can be obtained at the back of the second lens group holding member 4, therefore, a sufficient engagement length of the guiding portion can also be obtained, and the optical axes of the front lens group and back lens group assuredly coincide with each other, thereby the lens performance is increased.

According to the camera equipped with a zoom lens of the present invention, the back lens group holding member is forced by a forcing member attached to the second lens group holding member, therefore, the cam pin is brought into contact with one side wall of the cam groove by the smaller number of parts, thereby, processing of the cam groove is easy, and the lens performance is also increased.

According to the camera equipped with a zoom lens of the present invention, a lens cover can be opened and closed by a simple driving member.

According to the camera equipped with a zoom lens of the present invention, because the lens cover is located directly before the front lens, when a ray of light which obliquely enters into the front lens, is considered, dimension of the opening may be minimum, and as the result, dimension of the lens cover itself is also decreased, and the outer diameter of the lens barrel can also be formed into a minimum.

According to the camera equipped with a zoom lens of the present invention, the lens cover ring is located in a circular groove provided on the lens cover base, thereby, a lens cover unit having a smaller thickness can be realized.

According to the camera equipped with a zoom lens of the present invention, different switches are respectively detected in the case where the lens barrel advances from the collapsed lens position to the photographing area, and in the case where the lens barrel is withdrawn from the photographing area to the collapsed lens position, and therefore, no problem occurs even if respective switch positions are dispersed, and the degree of freedom of a design work for the switch position is increased and the productivity is increased.

According to the camera equipped with a zoom lens of the present invention, a cubic cam is located in the dead space of the real image type zoom finder, thereby, the size reduction of the camera can be realized, and variable magnification of the real image type zoom finder can be carried out highly accurately.

According to the camera equipped with a zoom lens of the present invention, in addition to the above effects, adjustment or inspection of the real image type zoom finder carried out as a unit, thereby, the production efficiency is increased.

According to the camera equipped with a zoom lens of the present invention, for a variable magnification lens which has a great influence upon the finder performance, the cam surface and the gear rotating it can be molded by the same molding die, and the parting line is not formed on the cam surface, thereby, the variable magnification operation can be carried out highly accurately.

According to the camera equipped with a zoom lens of the present invention, 2 cam surfaces and gears rotating them can be molded by the same molding die, and the parting line is not formed on the cam surface, thereby, the variable magnification operation can be carried out highly accurately.

According to the camera equipped with a zoom lens of the present invention, a cylindrical battery or a main capacitor for strobe light, which is a relatively large part, is efficiently arranged, thereby, it greatly contributes to the size reduction of the camera.

According to the camera equipped with a zoom lens of the present invention, a cylindrical battery, which is a relatively large part, is efficiently arranged, thereby, it greatly contributes to the size reduction of the camera, and even when liquid of the cylindrical battery leaks, that does not influence on peripheral members.

According to the camera equipped with a zoom lens of the present invention, because each element can be equipped in the battery chamber and formed into a unit, the production efficiency is increased.

According to the camera equipped with a zoom lens of the present invention, when the print size is selected by the external operation and magnetically recorded on the APS film, a highly reliable structure can be obtained.

Disclosed embodiment can be varied by a skilled person without departing from the spirit and scope of the invention.

What is claimed is:

1. A camera equipped with a zoom lens for forming an image of an object onto a film surface, comprising:

a front lens group provided between the object and the film surface, the front lens group comprising a first lens group, adjustable aperture blades provided between the first lens group and the film surface, a second lens group provided between adjustable aperture blades and the film surface, and a second lens group-holding member;

a back lens group provided between the front lens group and the film surface; and an actuator to drive the adjustable aperture blades, the actuator provided on the object-side from a space between the second lens group and the back lens group.

2. The camera of claim 1, further comprising:

a back lens group-holding member for holding the back lens group, wherein the back lens group-holding member is engaged with the second lens group-holding member so as to prohibit the rotation of the back lens group-holding member.

3. The camera of claim 1, further comprising:

a first lens group-holding member for holding the first lens group, wherein the first lens group-holding member is retained by the second lens group-holding member.

4. The camera of claim 1, wherein the second lens group-holding member comprises at least one of a helicoid, a cam groove and a cam pin.

5. The camera of claim 1, wherein the second lens group-holding member is a second lens group frame for fixing directly and holding the second lens group.

6. The camera of claim 5, wherein the second lens group frame is used as a lens barrel.

7. The camera of claim 1, wherein the second lens group-holding member is a lens barrel for fixing and retaining a second lens group frame for retaining the second lens group.

8. The camera of claim 1, wherein the second lens group-holding member is engaged with a cam cylinder.

9. The camera of claim 1, wherein the actuator is provided on the object-side from the first lens group.

10. The camera of claim 9, further comprising:

a first lens group-holding member for holding the first lens group, wherein the actuator is retained by the first lens group-holding member.

11. The camera of claim 1, wherein a part of the second lens group-holding member is exposed to the outside as a part of an external figure member.

12. The camera of claim 1, further comprising:

a back lens group-holding member for holding the back lens group, wherein the back lens group-holding member is provided with a cam pin or a cam groove with which the back lens group-holding member is driven by a cam mechanism.

13. The camera of claim 1, further comprising:

a back lens group-holding member for holding the back lens group and a urging member, wherein one end of the urging member is linked with the front lens group-holding member and the other end of the urging member is linked with the back lens group-holding member so that the back lens group-holding member is urged in a direction of an optical axis.

14. The camera of claim 1, further comprising:

a lens cover provided on the object-side from the first lens group-holding member, a first driving member rotatable around an axis provided on the first lens group-holding member, and a second driving member slidable in a direction of an optical axis on a guide section provided on the second lens group-holding member, whereby the lens cover is opened or closed by the first driving member and the second driving member.

15. The camera of claim 1, further comprising:

a straight movement guiding member being engaged with the second lens group-holding member so as to prohibit the rotation of the second lens group-holding member.

16. The camera of claim 1, further comprising:

a lens cover which is opened and closed by rotation, a lens cover base for supporting the lens cover by an axis, a lens cover ring for opening and closing the lens cover by rotation, and a decorative holding member for decorating the outside of the lens and holding the lens cover ring, wherein lens cover, the lens cover base, the lens cover ring, and the decorative holding member are arranged in front of the picture taking lens in the order from the picture taking lens side.

17. The camera of claim 16, wherein the lens cover base is provided with a circular groove in which the lens cover ring is located.

18. The camera of claim 1, further comprising:

a lens barrel for holding the front lens group and the back lens group, wherein the lens barrel is extended by electric drive from a collapsible lens position at which the lens barrel retreats most to a film side, to a photographing area in which photographing is conducted, through a non-photographing area in which photographing is not conducted; a focal length in the photographing area is previously divided into a plurality of small areas, and the lens barrel is stopped at an initial position in the predetermined small area by a zooming operation, a control means including a zoom position switch for outputting a signal to determine the initial position in the small area at a predetermined interval in the photographing area, and for outputting the signal in also the non-photographing area;

a collapsible lens switch to be switched on or off at a predetermine position in the non-photographing area; and a power switch for starting the position control of the lens barrel; the control means controls in such a manner that wherein when the power switch is turned on at the collapsible lens position, only the zoom position switch is detected and the lens barrel is advanced to the initial position in the first small area in the photographing area, and when the power switch is turned off in the photographing area, only the collapsible lens switch is detected and the lens barrel is caused to retreat to the collapsible lens position.

19. The camera of claim 1, further comprising:

a zoom finder;

a gear rotatable in accordance with a variable magnifying operation of the zoom lens, a shaft adjacent to the gear and formed integrally with the gear in a single unit, and a solid cam formed integrally with the gear and for moving a variable magnifying lens of the zoom finder in the optical axis direction on its cam surface provided in its axial direction, wherein the outer diameter of the shaft adjacent to the gear is the same as that of the gear teeth or larger than that; the outer diameter of the cubic cam adjacent to the shaft is formed to be larger than that of the shaft; the cam surface is formed on the gear side; and a parting line is provided on the outer peripheral surface of the solid cam.

20. The camera of claim 19, wherein the cum surface of the solid cam is formed on the gear side.

21. The camera of claim 20, wherein the solid cam comprises a first cam surface provided on the gear side and a second cam surface provided on a side opposite to the gear side, and two pieces of variable magnifying lenses are shifted by the first and second cam surfaces, and wherein one of the two pieces of variable magnifying lenses giving the performance of the zoom finder the stronger influence than the other one is shifted by the first cam surface.

22. The camera of claim 20, wherein the cubic cam is shaped in the form of two stages and provided with two cam surfaces on the gear side.

23. The camera of claim 1, further comprising:
a real image type zoom finder comprising
an object lens including a fixed lens and a shiftable lens such that variable magnification is conducted by moving the shiftable lens in a direction of optical axis,
a first reflecting surface to reflect an image of the object projected from the object lens into a right angle,
a second reflecting surface to reflect the image of the object reflected from the first reflecting surface into a right angle and to project the image of the object in a direction which is parallel to the optical axis of the object lens and reverse to the projecting direction of the object lens,
a third reflecting surface to reflect the image of the object reflected from the second reflecting surface into a right angle and to project the image of the object in a direction perpendicular to the optical axis of the object lens,
a fourth reflecting surface to reflect the image of the object reflected from the third reflecting surface into a right angle and to project the image of the object in a direction which is parallel to the optical axis of the object lens, and
an eyepiece lens to receive and enlarge the image of the object and to project the enlarged image of the object at a position corresponding to pupil of a photographer;
a lens barrel for holding the zoom lens and for moving in a direction of an optical axis in accordance with a variable magnifying operation, the lens barrel having a straight movement member moving along a straight line in accordance with the variable magnifying operation;
a cam pin standing on the straight movement member;
a cam member including a cam engaging with the cam pin and a wheel gear, the cam member adapted to move only in a direction perpendicular to the optical axis of the zoom lens;

a pinion gear to engage with the wheel gear;
a cubic cam formed coaxially and integrally with the pinion gear and to shift the shiftable lens in the direction of the optical axis, the cubic cam provided beneath the object lens in the vicinity of the reverse surface of the third reflecting surface.

24. The camera of claim 1, further comprising:
one of a light emitting element to emit infrared light toward the object and a light receiving element to receive infrared light reflected from the object;
a light collecting lens for collecting one of the infrared light emitted from the light emitting element and the infrared light to be received by the light receiving element;
a reflecting mirror provided between one of the light emitting element and the light receiving element and the light collecting lens and to reflect an outgoing light in a direction bent by the right angle from an incoming light; and
one of a cylindrical battery and a main condenser for a strobe which is located in the vicinity of the reverse surface of the reflecting mirror.

25. The camera of claim 1, further comprising:
one of a light emitting element to emit infrared light toward the object and a light receiving element to receive infrared light reflected from the object;
a light collecting lens for collecting one of the infrared light emitted from the light emitting element and the infrared light to be received by the light receiving element;
a reflecting mirror provided between one of the light emitting element and the light receiving element and the light collecting lens and to reflect an outgoing light in a direction bent by the right angle from an incoming light; and
a battery room to accommodate a cylindrical battery, the battery room arranged in the vicinity of the reverse surface of the reflecting mirror.

26. The camera of claim 1, further comprising:
an integral unit switch including two pieces of movable sections;
a switch actuating member rotated by an external operation to determine one of print sizes of classic size, Hi-Vision size and panorama size and actuating at least one of the two pieces of movable sections in accordance with the determined print size, whereby the integral unit switch outputs a signal corresponding to the determined print size;
a recording circuit to record the determined print size on APS type film on the basis of the signal from the integral unit switch.

* * * * *